(12) United States Patent
Horihata

(10) Patent No.: US 8,972,639 B2
(45) Date of Patent: Mar. 3, 2015

(54) COMMUNICATION APPARATUS, RELAY APPARATUS, COMMUNICATION SYSTEM AND COMMUNICATION METHOD

(75) Inventor: Satoshi Horihata, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 792 days.

(21) Appl. No.: 13/126,708

(22) PCT Filed: Nov. 3, 2009

(86) PCT No.: PCT/JP2009/005835
§ 371 (c)(1),
(2), (4) Date: Apr. 28, 2011

(87) PCT Pub. No.: WO2010/052892
PCT Pub. Date: May 14, 2010

(65) Prior Publication Data
US 2011/0208884 A1 Aug. 25, 2011

(30) Foreign Application Priority Data

Nov. 4, 2008 (JP) ................................. 2008-283538
Nov. 4, 2008 (JP) ................................. 2008-283539

(51) Int. Cl.
*G06F 13/42* (2006.01)
*H04L 12/40* (2006.01)
(Continued)

(52) U.S. Cl.
CPC ........ *H04L 12/40143* (2013.01); *G06F 13/385* (2013.01); *H04L 12/4625* (2013.01); *H04L 2012/40273* (2013.01)
USPC .......................................... 710/105; 710/106

(58) Field of Classification Search
USPC .................................. 710/29, 52–61, 105–106
See application file for complete search history.

(56) References Cited

U.S. PATENT DOCUMENTS 5,517,504 A * 5/1996 Tran et al. ...................... 370/347
5,918,074 A * 6/1999 Wright et al. .................... 710/52
(Continued)

FOREIGN PATENT DOCUMENTS

CN 1591376 A 3/2005
DE 10148331 A1 7/2003
(Continued)

OTHER PUBLICATIONS

"Introduction to CAN," 2006, Renesas Electronics Corporation, Published Jan. 31, 2006 (with translation), <http://documentation.renesas.com/jpn/products/mpumcu/apn/rjj05b0937_canap.pdf>.
(Continued)

*Primary Examiner* — Raymond Phan
(74) *Attorney, Agent, or Firm* — Oliff PLC

(57) ABSTRACT

It is expected to provide a communication apparatus, relay apparatus, communication system and communication method for effectively performing a communication timing adjustment when a collision has occurred on a communication line, efficiently reducing the communication collision with reducing processing loads on each apparatus, for making each apparatus effectively perform the transmission timing adjustment, and for improving the communication efficiency. ECUs are connected to communication lines with a bus topology. A relay apparatus is connected to the communication lines, obtains a time distribution based on a number of messages transmitted to the communication lines. When the bias occurs in the transmission timings, the relay apparatus transmits an instruction message that instructs to perform the timing adjustment for messages transmitted between the ECUs. In addition, it is determined whether a message to be relayed is held. When it is determined that such a message is held, the instruction message is transmitted.

19 Claims, 24 Drawing Sheets

(51) Int. Cl.
*G06F 13/38* (2006.01)
*H04L 12/46* (2006.01)

(56) References Cited

U.S. PATENT DOCUMENTS

| | | | |
|---|---|---|---|
| 5,982,778 A | 11/1999 | Mangin et al. | |
| 6,934,776 B2* | 8/2005 | Connor et al. | 710/60 |
| 7,426,181 B1* | 9/2008 | Feroz et al. | 370/232 |
| 7,584,312 B2* | 9/2009 | Kuroda et al. | 710/52 |
| 7,702,842 B2* | 4/2010 | Noda et al. | 710/315 |
| 7,978,599 B2* | 7/2011 | Stone et al. | 370/229 |
| 8,006,006 B2* | 8/2011 | Ma | 710/48 |
| 8,036,241 B2* | 10/2011 | Ji et al. | 370/443 |
| 8,121,035 B2* | 2/2012 | Oh et al. | 370/235 |
| 8,194,756 B2* | 6/2012 | Quigley et al. | 375/240.26 |
| 8,250,230 B2* | 8/2012 | Kaler et al. | 709/233 |
| 8,301,821 B2* | 10/2012 | Ihle et al. | 710/315 |
| 2003/0117298 A1 | 6/2003 | Tokunaga et al. | |
| 2005/0066097 A1 | 3/2005 | Kawamoto et al. | |
| 2007/0177520 A1 | 8/2007 | Morinaga et al. | |
| 2007/0195699 A1 | 8/2007 | Kloth | |
| 2008/0232266 A1 | 9/2008 | Jitsui et al. | |

FOREIGN PATENT DOCUMENTS

| | | |
|---|---|---|
| JP | A-02-047943 | 2/1990 |
| JP | A-11-053274 | 2/1999 |
| JP | A-11-306153 | 11/1999 |
| JP | A-2002-016614 | 1/2002 |
| JP | A-2003-273960 | 9/2003 |
| JP | A-2005-159568 | 6/2005 |
| JP | A-2007-060400 | 3/2007 |
| JP | A-2007-208327 | 8/2007 |
| JP | A-2007-243747 | 9/2007 |
| JP | A-2008-236307 | 10/2008 |
| JP | A-2008-236408 | 10/2008 |

OTHER PUBLICATIONS

International Search Report issued in corresponding International Patent Application No. PCT/JP2009/005835 dated Jan. 26, 2010.
Jul. 10, 2012 Office Action issued in Japanese Patent Application No. 2010-536685 (with translation).

* cited by examiner

F I G. 3

| MESSAGE ID | PRIORITY | PERMISSION OF DELAY | FAMILY |
|---|---|---|---|
| 010 | 1 | NOT-PERMITTED | C |
| 020 | 2 | NOT-PERMITTED | C |
| 050 | 3 | PERMITTED | B |
| 100 | 4 | PERMITTED | A |
| 150 | 5 | NOT-PERMITTED | A |
| 180 | 6 | PERMITTED | C |
| 200 | 7 | PERMITTED | A |

FIG. 4

RELAY TABLE

| MESSAGE ID | RELAY SOURCE | RELAY DESTINATION |
|---|---|---|
| 010 | 0 | 1 |
| 020 | 0 | 1 |
| 050 | 0 | 1 |
| 180 | 0 | 1 |

F I G. 5

| GROUP | MESSAGE ID | MASTER MESSAGE |
|---|---|---|
| (1) | 010 | 1 |
|  | 020 | 2 |
|  | 180 | − |
| (2) | 150 | 1 |
|  | 200 | − |
| (3) | 050 | 1 |
| (4) | 100 | 1 |

F I G. 9
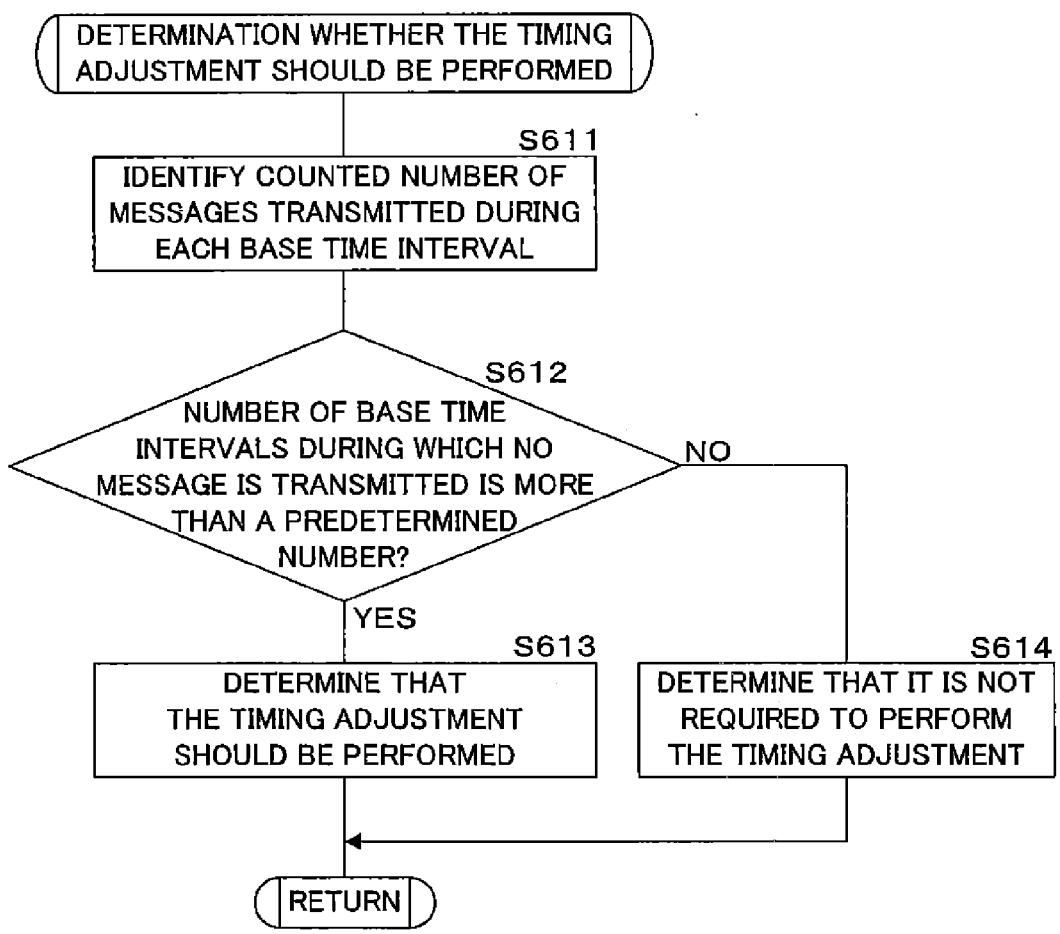

F I G. 1 2
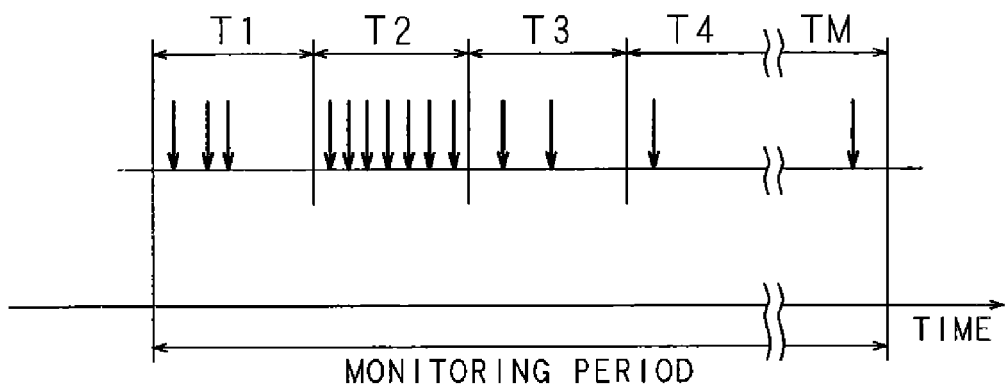

F I G. 1 4
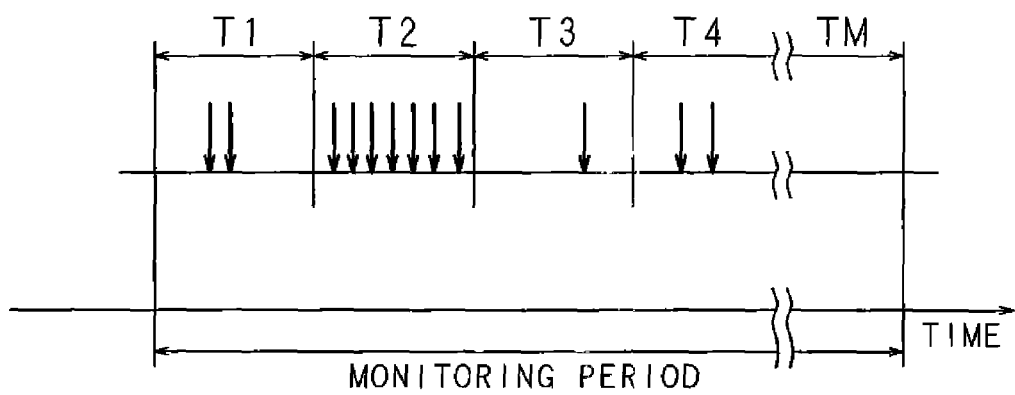

F I G. 1 8
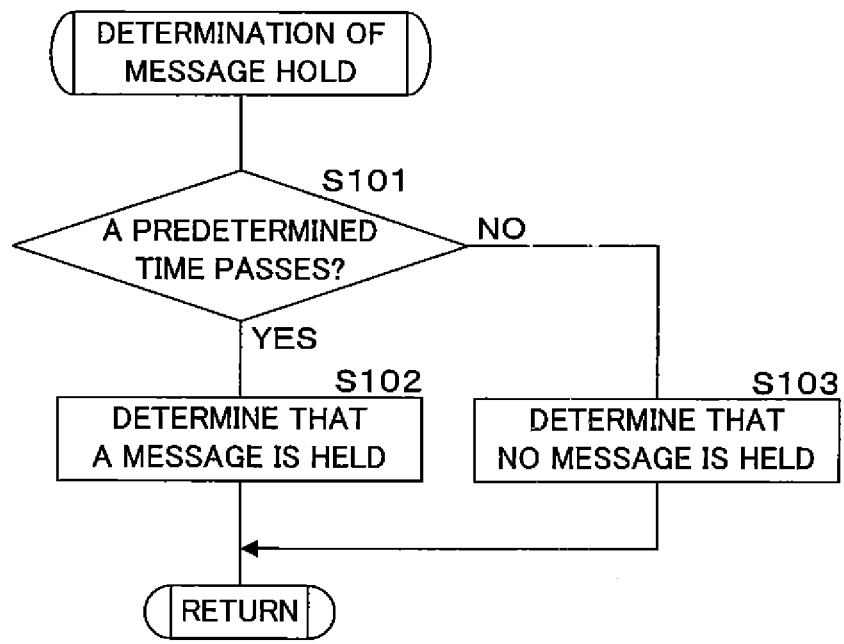

F I G. 1 9
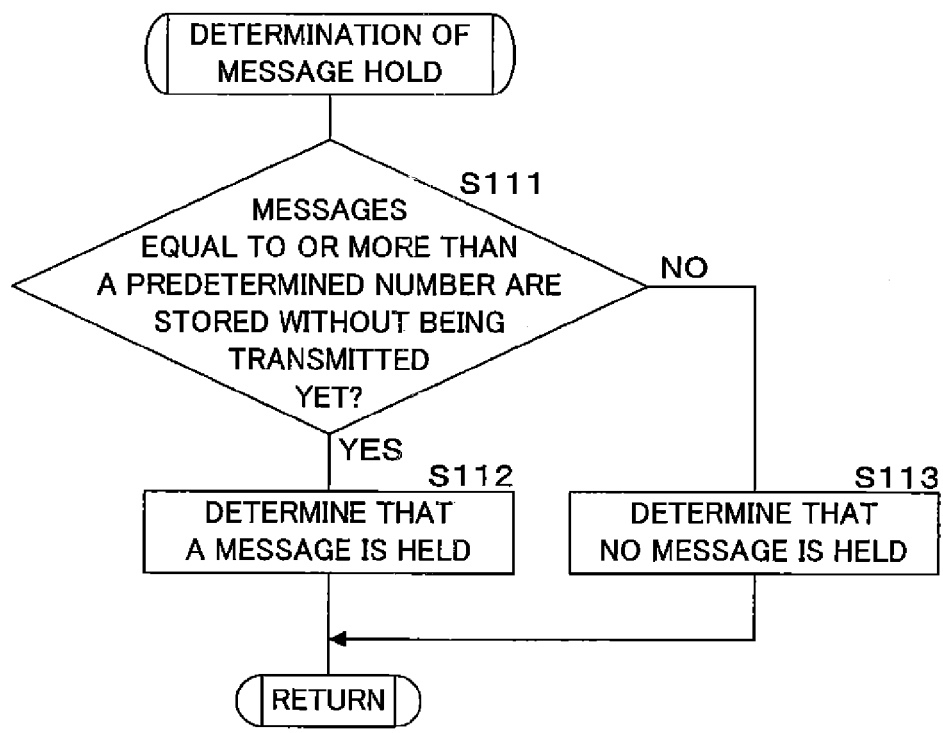

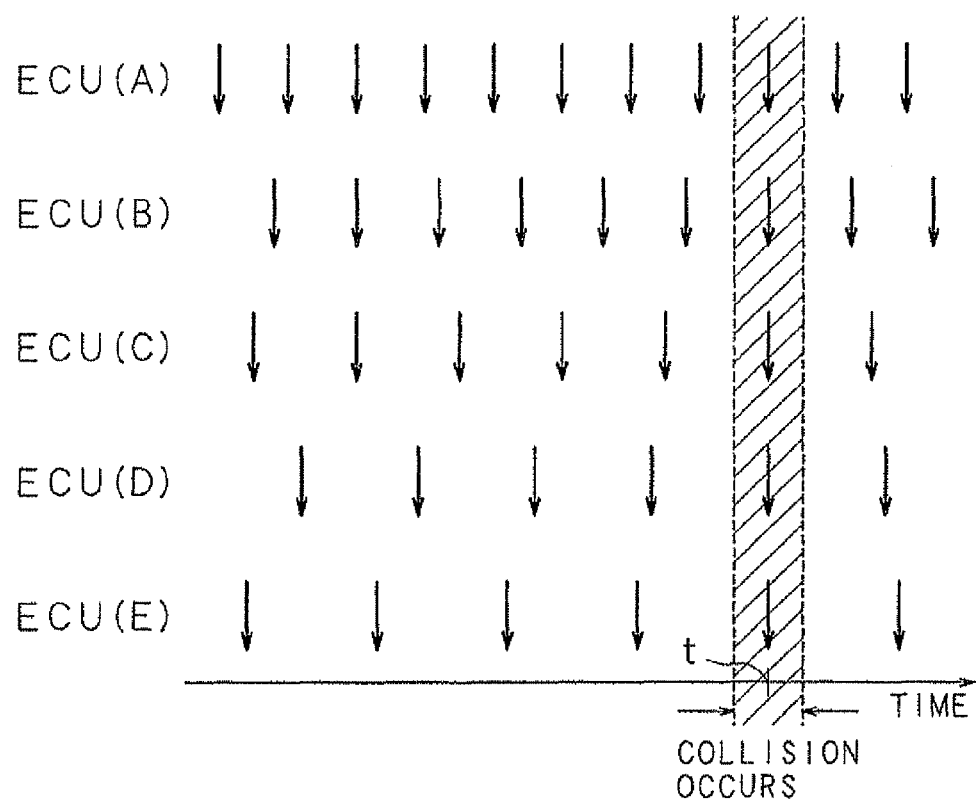

COMMUNICATION APPARATUS, RELAY APPARATUS, COMMUNICATION SYSTEM AND COMMUNICATION METHOD

This application is the national phase under 35 U.S.C.§371 of PCT International Application No. PCT/JP2009/005835 which has an International filing date of Nov. 3, 2009 and designated the United States of America.

BACKGROUND OF THE INVENTION

1. Field of the Invention

The present invention relates to a communication system transmitting data among plural apparatuses. Particularly, the present invention relates to: a communication apparatus that can reduce a communication collision on a communication line to which the apparatuses are connected and that can improve communication efficiency a relay apparatus that can improve communication efficiency for relaying to another communication line; a communication system including the communication apparatus or relay apparatus; and a communication method with the communication apparatus or relay apparatus.

2. Description of Related Art

Recently, several fields utilize a system in which plural apparatuses are connected, a function is assigned to each apparatus, the plural apparatuses mutually exchange data, and the communicating plural apparatuses implement several operations. For example, a field of on-vehicle local area network (on-vehicle LAN) mounted on a car utilizes a system in which a specialized function is assigned to each electronic control unit (ECU), the plural ECUs are connected with a communication line to mutually exchange data, and the communicating plural ECUs implement several operations.

Much more specialized function have been assigned to the ECU, the ECU has been able to implement much more various functions, and then, a communication line has been connected to a larger number of ECUs and much more various types of ECUs. Such a system is further expected to implement a larger variety of operations, and thus, a transmitted data amount is expected to be larger because ECUs must share data and communicate to each other.

When the communication line transmits a larger amount of data, data collision (conflict) may occur which causes a data delay. A significant data delay may bring a fatal event to a driving function implemented by an ECU, such as a brake control.

FIG. 23A and FIG. 23B are explanation views showing an example case where the data collision occurs in data transmitted from ECUs on a communication line. FIG. 23A shows a configuration where an ECU (A), ECU (B), ECU (C), ECU (D) and ECU (E) are connected with a bus topology. In this configuration, it is possible to transmit data when each communication line is opened. FIG. 23B shows a time sequence illustrating a data transmission timing of each ECU. As shown in FIG. 23A and FIG. 23B, each ECU transmits data at a predetermined interval. The predetermined interval is almost fixed for each ECU, although the predetermined interval may be changed a little due to the performance of ECU. Predetermined intervals of respective ECUs may be set differently from each other, e.g., 10 milliseconds, 12 milliseconds, 15 milliseconds, in order to avoid the collision of transmitted data. However, there is a timing at which plural ECUs try to transmit data almost simultaneously as shown by the time point "t" in FIG. 23B, i.e., a cycle that is the least common multiple of predetermined transmission intervals for respective ECUs. This timing cyclically comes and causes the data collision.

It is known that a definition; such as the FlexRay, controls data transmission with a time triggered protocol (TTP). Such a definition divides a predetermined communication cycle of each ECU and allows the communication at an assigned period, in order to avoid the data collision. However, it is preferred to be free from the constraint based on the time triggered protocol definition, and to prepare a definition applicable to the controller area network (CAN) that is typically utilized for the on-vehicle LAN and performs an event triggered control.

A patent document 1 proposes a control technique that utilizes a method applicable to the CAN and prevents the data collision caused by communication interference between ECUs. In the technique disclosed by the patent document 1, each ECU includes a time measuring means, measures a timing of data transmitted from another ECU, decides own data transmission timing to start transmitting data after another ECU completes data transmission, in order to avoid the communication collision.

In addition, it is known to divide a communication line into several different communication lines, to connect each ECU to a different communication line, to utilize a relay apparatus (gateway apparatus) for connecting the different communication lines, and to make the relay apparatus relay data, in order to avoid the collision caused by the increased number of ECUs connected to communication lines (e.g., patent document 2). Because these configurations reduce the number of ECUs connected to communication lines, it may be possible to reduce a communication amount and to avoid the data collision and the like. In these configurations, it may be further possible to save required communication lines and to avoid the collision, when ECUs sharing data are classified into a same group.

A patent document 3 discloses a technique in which ECUs utilized in the on-vehicle LAN field are classified into plural groups, ECUs classified in each group are connected to one communication line, and one communication line is connected to another communication line by a relay apparatus (gateway apparatus), in order to preferably relay high priority data based on the priority provided to transmitted message, and to prevent the transmission of high priority data from being delayed significantly even when the amount of communication loads are increased on communication lines.

The "priority" corresponds to a message ID provided to a message in the CAN typically utilized for the on-vehicle LAN, and the CAN is defined to preferably transmit a message provided with a smaller number in the case that the message ID is interpreted as such a number (non-patent document 1).

When a relay apparatus tries to relay a message received from an. ECU connected to one communication line toward another communication line or relay a message created from the received message toward another communication line, the relay apparatus may not enable relaying because of lower priority in the case that another communication line is utilized for transmitting high priority message greater than the message transmitted through said one communication line. At that time, there may be another message to be relayed from said another communication line which is held without being transmitted.

Even if these messages should be simultaneously received by an apparatus requiring these messages in this case, one of these messages is held without being relayed by the relay apparatus. Therefore, it is not possible to keep the simultaneous message reception. Hence, it is considered to utilize a method adjusting the transmission timing for each message, in order to prevent the message from being held due to the relay apparatus. The method utilizes the invention disclosed by the patent document 1. In the method, each ECU includes the time measuring means, measures the timing of data transmitted from another ECU, decides own data transmission timing to start transmitting data after another ECU completes data transmission, in order to avoid the communication collision.

[Patent Document 1] Japanese Patent Application Laid-Open No. 2007-60400
[Patent Document 2] Japanese Patent Application Laid-Open No. 2002-16614
[Patent Document 3] Japanese Patent Application Laid-Open No. 2005-159568
[Non-Patent Document 1] CAN Nyuumonsho (URL:http://documentation.renesas.com/jpn/products/mpumcu/apn/rjj05b0937_canap.pdf), Jan. 31, 2006, Renesas Electronics Corporation, online searched on Aug. 25, 2008.

SUMMARY OF THE INVENTION

The technique disclosed by the patent document 1 may avoid the communication collision between apparatuses connected with a bus topology. However, in the case of utilizing a configuration that determines the transmission timing based on a data transmission from a predetermined apparatus, there is a risk that the transmission timings for all apparatuses other than the predetermined apparatus cannot be determined when a failure happens to the predetermined apparatus and the predetermined apparatus cannot transmit data. In addition, in the case of utilizing a configuration that independently makes each apparatus decide the transmission timing based on a data transmission from another apparatus, respective decided transmission timing may not converge efficiently.

Further, in the case of utilizing a configuration that independently makes each apparatus count the data transmission from another apparatus all the time to determine the transmission timing, each apparatus must take a larger amount of processing load. When there is no transmission data on the communication line, it is not required to make each apparatus determine the transmission timing.

The present invention is made in view of such circumstances, and has an object to provide a communication apparatus, communication system and communication method, where plural apparatuses are connected to a communication line with a bus topology, each apparatus performs transmission timing adjustment, a communication apparatus connected to the communication line perform the transmission timing adjustment effectively at the time when a collision occurs on the communication line, the communication collision is reduced efficiently as well as the processing load amount is reduced for each apparatus, and each apparatus performs the transmission timing adjustment effectively, in order to improve the communication efficiency.

The present invention has another object to provide a relay apparatus, communication system including the relay apparatus and communication method utilizing the relay apparatus, where a relay apparatus is utilized for relaying message transmission between plural apparatuses connected to a communication line with a bus topology, a message is prevented from being held by the relay apparatus, the communication collision is reduced efficiently as well as the processing load amount is reduced for each apparatus, and the communication efficiency for whole communication system is improved.

A communication apparatus according to a first aspect of the present invention is connected to a communication line to which plural apparatuses transmitting messages are connected with a bus topology, receives a part or all the messages transmitted to the communication line, and comprises: a means for determining whether it is required for performing a timing adjustment of a message transmission on the communication line or not; and a means for transmitting a message instructing to perform the timing adjustment of the message transmission, when it is determined by the means that it is required for performing the timing adjustment of the message transmission on the communication line.

A communication apparatus according to a second aspect the of present invention is connected to a communication line to which plural apparatuses transmitting messages are connected with a bus topology, receives a part or all the messages transmitted to the communication line, and comprises: a counting means for counting a number of messages transmitted during a predetermined monitoring period that is divided into plural time intervals; a determining means for determining in accordance with a number of messages counted for each of the plural time intervals by the counting means whether it is required for performing a timing adjustment of a message transmission between the plural apparatuses or not; and a means for transmitting a message instructing to perform the timing adjustment of the message transmission, when it is determined by the determining means that it is required for performing the timing adjustment of the message transmission between the plural apparatuses.

A communication apparatus according to a third aspect of the present invention includes the determining means that comprises a means for determining whether a number of time intervals in which a message cannot be transmitted is not less than a predetermined number among the plural time intervals, and that determines to perform the timing adjustment of the message transmission when it is determined that the number of time intervals is not less than the predetermined number.

A communication apparatus according to a fourth aspect of the present invention includes the determining means that comprises a means for determining whether a number of messages in one or more time intervals among the plural intervals is not less than a predetermined number, and that determines to perform the timing adjustment of the message transmission when it is determined that the number of messages is not less than the predetermined number.

A communication apparatus according to a fifth aspect of the present invention includes the determining means that comprises a means for determining whether the maximum in numbers of messages during the plural intervals is not less than a predetermined-fold of the minimum in the numbers of messages during the plural intervals, and that determines to perform the timing adjustment of the message transmission when it is determined that the maximum is not less than the minimum.

A communication apparatus according to sixth aspect of the present invention includes the counting means that utilizes the predetermined monitoring period as a cycle and periodically counts at each cycle, and further comprises: a means for determining that the determining means sequentially determines not less than predetermined times that it is not required for a cycle; and a means for transmitting a message instructing to stop the transmission timing adjustment toward the communication line.

A communication apparatus according to seventh aspect of the present invention further comprises a means for determining a time point when a message instructing to perform the transmission timing adjustment is transmitted, in accordance with a distribution of messages counted by the counting means in each time interval during the monitoring period, wherein the message instructing to perform the transmission timing adjustment is transmitted toward the communication line at the transmission time point, when the determining means determines that it is required.

A relay apparatus according to eighth aspect of the present invention is connected to plural communication lines to which plural apparatuses transmitting messages are respectively connected with a bus topology, includes a means for receiving a part of or all of messages transmitted from each apparatus connected to one of the communication lines and a storing means for storing a received message, relays a stored message to an apparatus connected to another of the communication lines, and comprises: a determining means for determining whether a message transmitted from an apparatus connected to said one of communication lines is held or not; and a transmitting means for transmitting an instruction message instructing to perform a timing adjustment of message transmission between the plural apparatuses toward said one of communication lines, when the determining means determined that the message is held.

A relay apparatus according to a ninth aspect of the present invention includes the determining means that comprises a means for clocking elapsed time since a message is received and determines that the message is held, when the elapsed time is not less than a predetermined time.

A relay apparatus according to a tenth aspect of the present invention includes the determining means that comprises a means for counting a number of messages stored by the storing means, wherein it is determined that the message is held when the number of messages is not less than a predetermined number.

A relay apparatus according to an eleventh aspect of the present invention includes messages are respectively transmitted cyclically, wherein the relay apparatus comprises a means for identifying a transmission cycle of the messages stored by the storing means, when the determining means determined that the message is held, and the transmitting means transmits the instruction message at a timing based on the identified transmission cycle.

A relay apparatus according to twelfth aspect of the present invention includes the transmitting means that continuously transmits the instruction message until the determining means has determined that the message is not held.

A communication system according to a thirteenth aspect of the present invention includes plural apparatuses transmitting messages and a relay apparatus which is connected to plural communication lines to which the plural apparatuses are respectively connected with a bus topology, that receives a part of or all of messages transmitted from each apparatus connected to one of the communication lines and that relays to an apparatus connected to another of the communication lines, wherein the relay apparatus comprises: a means for counting a number of messages transmitted to one of the communication lines during a predetermined monitoring period divided into plural time intervals; a determining means for determining in accordance with the number of messages counted during the plural time intervals whether it is required to perform a timing adjustment of transmission between plural apparatuses connected to said one of communication lines or not; and a means for transmitting an instruction message instructing to perform the timing adjustment of transmission between the plural apparatuses toward said one of communication lines, when the determining means determined that it is required, and each of the plural apparatuses comprises: a means for detecting a time point when a specified message is transmitted, when the instruction message is received; and a means for adjusting, in accordance with a time lag between the detected time point and a time point when a message is transmitted by said each of the plural apparatuses itself, a next time point when a next message is transmitted by said each of the plural apparatus itself to shorten the time lag.

A communication system according to a fourteenth aspect of the present invention includes plural apparatuses cyclically transmitting messages and a relay apparatus that is connected to plural communication lines to which the plural apparatuses are respectively connected with a bus topology, that includes a means for receiving a part of or all of messages transmitted from each apparatus connected to one of the communication lines and includes a means for storing received messages, and that relays to an apparatus connected to another of the communication lines, wherein the relay apparatus comprises: a hold determining means for determining whether a message transmitted from an apparatus connected to said one of communication lines is held or not; and a transmitting means for transmitting an instruction message instructing to perform a timing adjustment of message transmission between the plural apparatuses toward said one of communication lines, when the hold determining means determined that the message is held, and each of the plural apparatuses comprises an adjusting means for adjusting a message transmission timing in association with another apparatus.

A communication system according to a fifteenth aspect of the present invention includes the relay apparatus that comprises a means for transmitting a message identification information at the time when the transmitting means transmits the instruction message, wherein the message identification information is for identifying a message stored by the storing means, the transmitting means comprises a means for identifying a transmission cycle of the message and transmits the instruction message at a timing based on the identified transmission cycle, and the adjusting means of each of the plural apparatuses comprises: an identifying means for identifying a timing when the instruction message is transmitted; a determining means for determining whether a message identified by the message identification information transmitted together with the instruction message is transmitted by said each of the plural apparatus itself or not; and a means for making a transmission timing of the message become close to the timing identified by the identifying means, when the determining means determined that the message is transmitted by said each of the plural apparatus itself.

A communication system according to a sixteenth aspect of the present invention includes the plural apparatuses, each of which comprises a means for making the transmission timing of the message become far from the timing identified by the identifying means, when the determining means determined that the message is not transmitted by said each of the plural apparatus itself.

A communication method according to seventeenth aspect of the present invention is for communicating between plural apparatuses transmitting messages and a communication apparatus that is connected to a communication line to which the plural apparatuses are respectively connected with a bus topology and that receives a part of or all of messages transmitted to the communication line, wherein the communication apparatus counts a number of messages transmitted during a predetermined monitoring time interval divided into plural time intervals, the communication apparatus determines in accordance with the counted number of messages at each of the plural time intervals whether it is required to perform a timing adjustment of transmission between the plural apparatuses, and the communication apparatus transmits a message instructing to perform the transmission timing adjustment when it is determined that it is required to perform the timing adjustment.

A communication method according to an eighteenth aspect of the present invention is for communicating between plural apparatuses transmitting messages and a relay apparatus that is connected to a communication line to which the plural apparatuses are respectively connected with a bus topology, that includes a means for receiving a part of or all of messages transmitted from the communication line and a storing means for storing received messages, and that relays a stored message to an apparatus connected to another communication line, wherein the relay apparatus determines whether a message transmitted from an apparatus connected to one communication line is held or not, the relay apparatus transmits an instruction message instructing to perform a timing adjustment of transmission between the plural apparatuses toward said one communication line, when having determined that the message is held, and the plural apparatuses respectively adjust a message transmission timing in association with another apparatus when having received the instruction message. According to the first aspect, messages are respectively transmitted from the plural apparatuses connected to the communication line with the bus topology toward the communication apparatus (relay apparatus) that determines whether a message adjustment should be performed for the communication line or not. When it has been determined that the message adjustment should be performed, the communication apparatus (or relay apparatus) transmits a message instructing to perform a transmission timing adjustment to each communication apparatus. Thus, each apparatus performs the transmission timing adjustment only on a timing that is considered to need taking the adjustment. The plural apparatuses are connected to the communication line, and may try to perform the transmission timing adjustment in association with each other in response to the message transmitted from the communication apparatus to the communication line, which instructs to perform the transmission timing adjustment. Therefore, it is not required to constantly perform the transmission timing adjustment, and it is possible to reduce the load on each apparatus.

According to the second, thirteenth and seventeenth aspects, the communication apparatus or the relay apparatus among the plural apparatuses counts the number of messages on the communication line during the predetermined monitoring time interval divided into plural time intervals, and determines in accordance with plural numbers, each of which is counted for messages at each time interval, whether it is required to perform the transmission timing adjustment for each apparatus.

According to the third aspect, it is determined that the transmission timing adjustment is required, when a number of time intervals whose counted messages are zero are not less than a predetermined number among the plural time intervals included in the monitoring period. In the case that there is a time interval whose number of transmitted messages is zero, it is surmised that the bias may occur on the message transmission timing. It is enough to perform the transmission timing adjustment at the case that such a bias is surmised. Therefore, it is not required to perform the constant adjustment.

According to the fourth aspect, it is determined that the transmission timing adjustment is required, when there is a time interval whose counted number of messages is not less than a predetermined number among the plural time intervals included in the monitoring period. In the case that there is a time interval whose number of transmitted messages is not less than a predetermined number, it is surmised that the bias may occur on the message transmission timing. It is enough to perform the transmission timing adjustment at the case that such a bias is surmised. Therefore, it is not required to perform the constant adjustment.

According to the fifth aspect, it is determined that the transmission timing adjustment is required when a number of messages transmitted during a time interval in which the maximum number of messages are transmitted during the plural time intervals included in the monitoring time interval (i.e., maximum number) is not less than a predetermined-fold of number of messages transmitted during a time interval in which the minimum number of messages are transmitted during the plural time intervals included in the monitoring time interval (i.e., minimum number). In the case that there is a time interval whose number of transmitted messages is not less than a predetermined-fold of the number of another time interval, it is surmised that the bias may occur on the message transmission timing. It is enough to perform the transmission timing adjustment at the case that such a bias is surmised. Therefore, it is not required to perform the constant adjustment.

According to the sixth aspect, the monitoring period is utilized as a reference of one cycle and messages are counted cyclically. It is instructed to stop the transmission timing adjustment, when the transmission timing adjustment is determined to be not required for sequential cycles not less than predetermined cycles in accordance with the counted number of messages during plural time interval in each monitoring period. In the case that the number of messages transmitted is uniformed for the monitoring period to some degree that the transmission timing adjustment is not required, each apparatus is not required to perform the transmission timing adjustment in association with another apparatus.

According to the seventh aspect, a timing is determined in accordance with the distribution of message number at each time interval in the monitoring period, and thus a message instructing to perform the transmission timing adjustment is transmitted at the determined timing. For example, in the case that a time interval having a smaller number of transmitted messages or, to the contrary, having a larger number of transmitted messages is identified in time intervals included in the monitoring period and thus it is determined that the transmission timing adjustment should be performed, the message instructing to perform the transmission timing adjustment is transmitted at a corresponding time interval in the next monitoring period. It is possible to start performing the transmission timing adjustment at the time point when each apparatus has received the message instructing to perform the adjustment. Therefore, the transmission timing can be adjusted efficiently in the case that the message instructing to perform the adjustment is adequately transmitted at the effective timing.

According to the eighth, fourteenth and eighteenth aspects, a message is transmitted from an apparatus connected to a predetermined communication line, and the transmitted message is temporarily stored by storing means. The relay apparatus relaying to another communication line determines whether a message is held without being transmitted from the communication line to another communication line. When the message is held, the relay apparatus transmits the instruction message instructing to perform the transmission timing adjustment for the apparatuses connected to the predetermined communication line. Thus, it is possible to adjust the transmission timing of the held message and the transmission timing of another message transmitted at around the same timing. Therefore, it is expected to prevent the message from being held longer and greater at the relay apparatus after the adjustment. In addition, it is not required for each apparatus to perform the transmission timing adjustment constantly, but it is enough for each apparatus to perform the transmission timing adjustment at the required time, in order to avoid the transmission collision on the communication line. Therefore, it is efficient and the processing load is also reduced from each apparatus.

According to the ninth aspect, the determination whether a message is held or not is performed in accordance with the elapsed time since the message is received by the relay apparatus. When the elapsed time is not shorter than a predetermined time, it is surmised that the delay occurs in the relaying processing. The adjustment should be performed in order to prevent another message from being further transmitted and to prevent messages from being held longer and greater.

According to the tenth aspect, the determination whether a message is held or not is performed in accordance with the number of messages that are received by the relay apparatus and stored by the storing means without being relayed. When the number of messages is not smaller than a predetermined number, the adjustment should be performed in order to prevent another message from being further transmitted and to prevent messages from being held longer and greater.

According to the eleventh aspect, each message is transmitted cyclically. In the case that a message is held without being relayed by the relay apparatus, an instruction message is transmitted at a timing corresponding to the transmission cycle of the held message, in order to inform the transmission cycle of the held message to an apparatus transmitting another message. Each apparatus can receive the instruction message, and can recognize that the cycle of received instruction message is equal to a transmission cycle of message that is not easily transmitted to another communication line. Therefore, it is possible to make own transmission timing become different from the transmission cycle.

According to the twelfth aspect, the instruction message is sequentially transmitted during the time interval determined that the message hold occurs. Each apparatus performs the transmission timing adjustment for messages, in accordance with the instruction message. When it has been determined that the message hold is solved, the transmission of instruction message is stopped and the transmission timing adjustment is stopped. Therefore, it is possible to perform the transmission timing adjustment only at the required time.

According to the fifteenth aspect, an instruction message is transmitted at the timing based on a transmission cycle regarding a held message in order to inform the transmission cycle to an apparatus transmitting another message. Then, the apparatus transmitting a message regarding the message hold adjusts own transmission timing based on the transmission timing regarding the instruction message, and utilizes the adjusted reference timing to transmit the subsequent messages regarding the message hold. Therefore, it is possible to make each apparatus know the transmission timing for the message regarding the message hold. Hence, it is efficient.

According to the sixteenth aspect, it is controlled to transmit messages other than the message regarding the message hold at transmission timings that are different from the transmission timing utilized for the message regarding the message hold. Thus, the control is performed to prevent many messages from reaching to the relay apparatus after the message regarding the message hold reaches. Therefore, it is possible to prevent the message hold from becoming longer and larger at the relay apparatus, and to improve the communication efficiency.

In the present invention, it may be configured to make each apparatus connected to a communication line with a bus topology perform the transmission timing adjustment, and to perform the adjustment only when each apparatus determines that the adjustment should be performed. Therefore, it is possible to reduce the processing load of each communication apparatus, to efficiently prevent the communication collision, to effectively adjust the transmission timing, and to improve the communication efficiency.

In the present invention, it may be configured to make each apparatus connected to a communication line with a bus topology perform the transmission timing adjustment, to determine in accordance with a counted number of messages transmitted on the communication line whether the present is in a condition requiring to perform the adjustment, e.g., the condition causing the collision, and to perform the adjustment only when the adjustment is required. Therefore, it is possible to reduce the processing load of each communication apparatus, to efficiently prevent the communication collision, to effectively adjust the transmission timing, and to improve the communication efficiency.

In the present invention, the transmission timing is adjusted when the message hold occurs due to the relay apparatus. It is possible after the adjustment to prevent a message from being unnecessarily held at the relay apparatus relaying the message transmission between plural apparatuses connected to a communication line with a but topology. In addition, when the relay apparatus receiving messages from respective apparatuses has determined that the adjustment should be performed, the instruction message is transmitted to perform the transmission timing adjustment. Therefore, it is possible to reduce the processing load of each communication apparatus, to efficiently prevent the communication collision, to effectively adjust the transmission timing, and to improve the communication efficiency as the entire system, in comparison with the case that each apparatus constantly performs the transmission timing adjustment.

Especially, the on-vehicle LAN performing a wire communicating through communication lines connected with a bus topology is desired to perform the efficient high speed communication, with reducing the communication collision, but without utilizing a resolution method making the communication speed become faster and giving a large amount of processing load on each apparatus. Even in such an especial case, the present invention can effectively reduce the communication collision on the communication line and can improve the communication efficiency.

BRIEF DESCRIPTION OF THE DRAWINGS

The above and further objects and features of the invention will more fully be apparent from the following detailed description with accompanying drawings.

FIG. 3 is an explanation view showing an example of contents included in a message transmitted between ECUs that are connected to a communication line according to the embodiment 1.

FIG. 4 is an explanation view showing an example of contents included in a relay table according to the embodiment 1.

FIG. 5 is an explanation view showing an example of groups classified for performing a transmission timing adjustment according to the embodiment 1.

FIG. 9 is a flowchart showing an example of a procedure regarding an adjustment requirement determination processing performed by a determining unit included in the relay apparatus according to the embodiment 1.

FIG. 12 is a view for explaining an example of the determination processing performed by the determining unit according to the embodiment 2.

FIG. 14 is a view for explaining an example of the determination processing performed by the determining unit according to the embodiment 3.

FIG. 18 is a flowchart showing an example of a procedure regarding a determination processing performed by the determining unit included in the relay apparatus according to the embodiment 4, whether a message is held or not.

FIG. 19 is a flowchart showing another example of the procedure regarding the determination processing performed by the determining unit included in the relay apparatus according to the embodiment 4, whether a message is held or not.

FIG. 23B is an explanation view showing the example case that the collision occurs on communication of data transmitted from the ECU through the communication line.

DESCRIPTION OF THE PREFERRED EMBODIMENTS

The present invention will be described in reference to figures that show embodiments according to the present invention. The embodiment described below is explained in the context of on-vehicle communication system, in which ECUs mounted on a car are connected, a relay apparatus relays data transmitted between the ECUs, and a communication apparatus according to the present invention is utilized as the relay apparatus.

(Embodiment 1)

Figure 1:
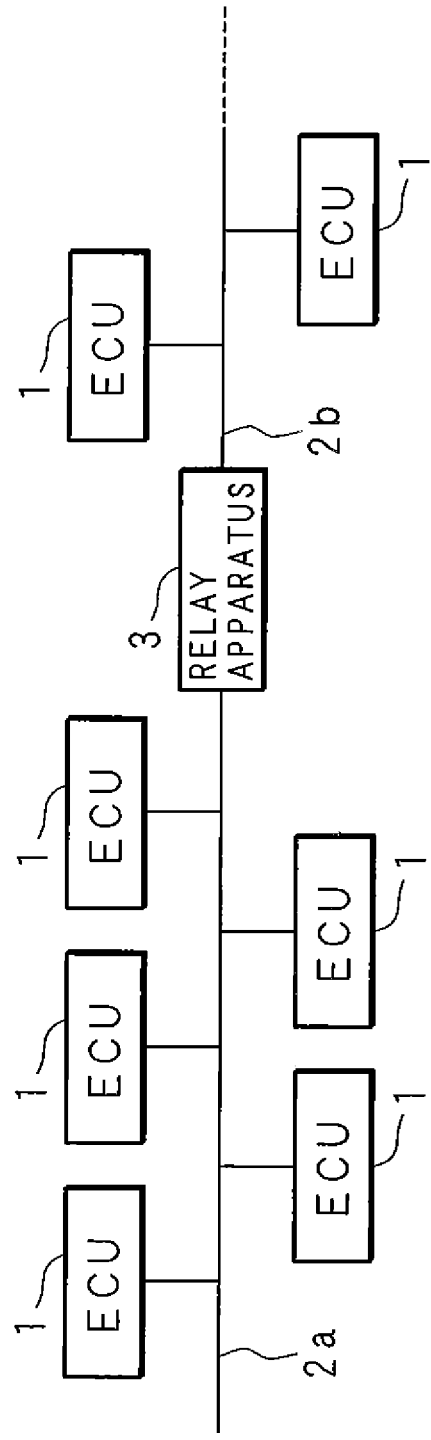
FIG. 1 is a configuration view showing a configuration of an on-vehicle communication system according to an embodiment 1.

FIG. 1 is a configuration view showing a configuration of the on-vehicle communication system according to an embodiment 1. The on-vehicle communication system includes: ECUs 1, 1, . . . that are apparatuses transmitting messages; communication lines 2a, 2b, each of which is connected to a group of ECUs 1, 1, . . . ; and a relay apparatus 3 that is connected to communication lines 2a, 2b and relays data transmitted between ECUs 1, 1, . . . .

ECUs 1, 1, . . . are respectively connected to communication lines 2a, 2b with a bus topology. For implementing functions of car, the ECUs 1, 1, . . . can transmit data including numerical information representing several physical values, such as a counted value, calculated value and control value, or can control an engine, brake and the like, with a microcomputer. When transmitting data including the numerical information, the ECUs 1, 1, . . . performs transmission based on the controller area network (CAN) protocol of a "message" including plural arranged data and being provided with a message ID based on the arranged plural data.

The communication lines 2a, 2b are connected with the bus topology to a relay apparatus 3, too. The relay apparatus 3 can receive all messages transmitted to the communication lines 2a, 2b.

The on-vehicle communication system described below is configured to make ECUs 1, 1, . . . controlled by the relay apparatus 3 adjust a message transmission timing in association with each other, for improving the communication efficiency on the communication lines 2a, 2b.

Figure 2:
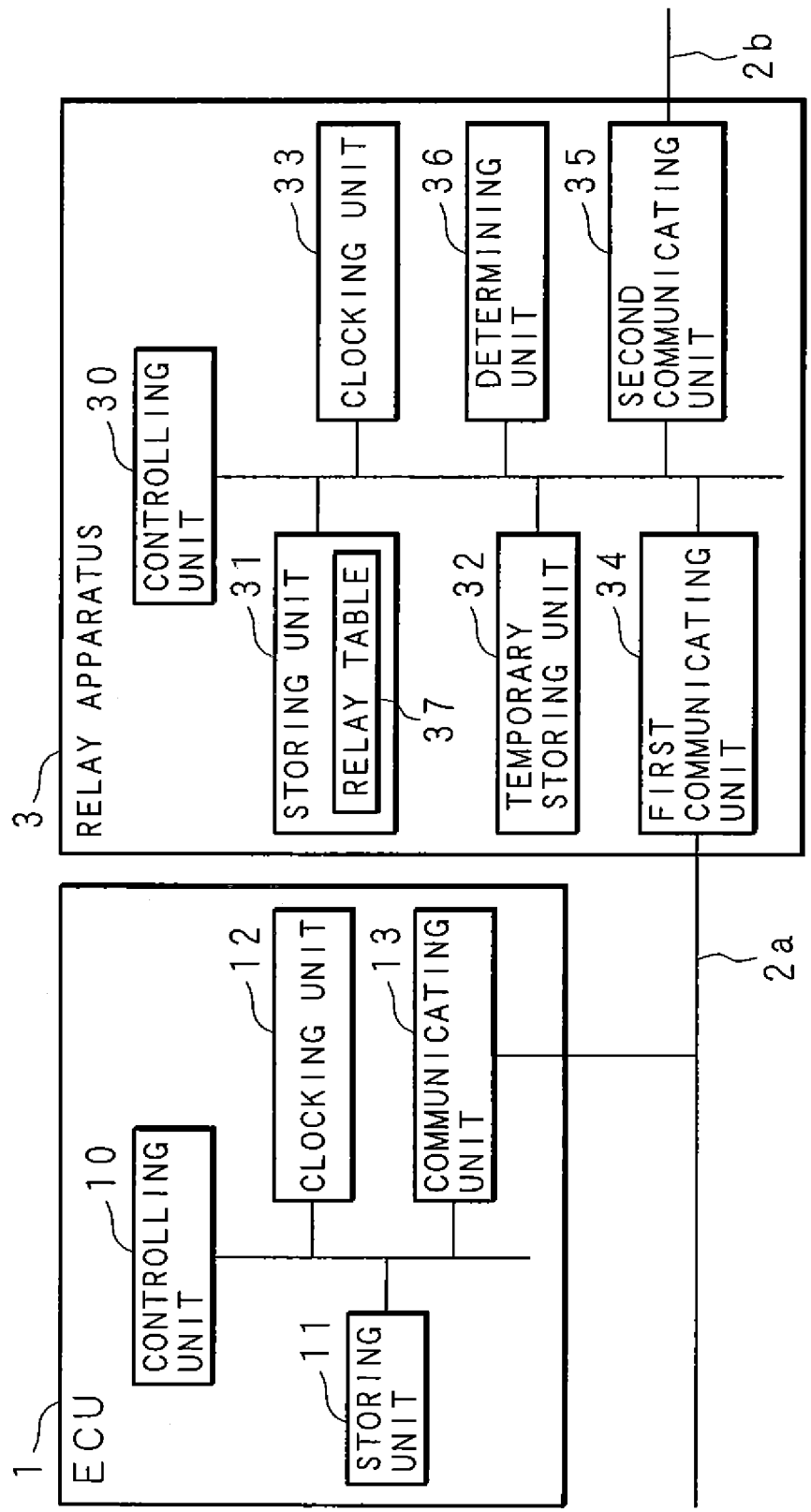
FIG. 2 is a block diagram showing components included in an ECU and a relay apparatus that configure the on-vehicle communication system according to the embodiment 1.

FIG. 2 is a block diagram showing components included in the ECU 1 and the relay apparatus 3 that configure the on-vehicle communication system according to the embodiment 1. The ECU 1 includes: a controlling unit 10 that consists of a central processing unit (CPU), a micro processing unit (MPU) or the like, and controls processing of each component; a storing unit 11 that consists of a memory, such as an electrically-erasable programmable read-only memory (EEPROM) or a flash memory; a clocking unit 12 that implements a timer function; and a communicating unit 13 that implements communication through the communication line 2a (or communication line 2b).

The controlling unit 10 of ECU 1 is configured to obtain electric power from a power supply apparatus (not shown), such as a battery or alternator mounted on the car, for controlling each component. The storing unit 11 stores computer program for implementing transmission timing adjustment described later or several information utilized by the controlling unit 10 to perform processing.

The clocking unit 12 clocks elapsed time with a predetermined frequency. The controlling unit 10 can obtain time information from the clocking unit 12 at a predetermined timing.

The communicating unit 13 is equipped with a network controller chip or a network controller function, and implements the communication through the communication line 2a (or communication line 2b). In the communication between the ECUs 1, 1, . . . and the relay apparatus 3 through the communication lines 2a, 2b, it is configured to transmit a message based on the CAN protocol. Therefore, the communicating unit 13 performs the message transmission based on the CAN protocol through the communication line 2a (or communication line 2b). For example, the controlling unit 10 of ECU 1 connected to the communication line 2a utilizes the communicating unit 13 to monitor communication conditions on the communication line 2a, determines whether the controlling unit 10 of ECU 1 itself can transmit a message or not, and transmits the message when possible. Typically, the ECU 1 can make the communicating unit 13 transmit neither the message, during a period that a message is transmitted neither by the other ECUs 1, 1, . . . similarly connected to the communication line 2a nor by the relay apparatus 3. In the CAN definition, the message ID works as the arbitration field. In the case that the message ID is represented in the binary number system, a message whose message ID possesses a longer zero bit string is preferentially transmitted. Thus, in the case that the message ID is interpreted to be a numerical value, a message whose ID is interpreted to be a smaller number is preferentially transmitted. When plural apparatuses has simultaneously tried to transmit messages among the ECUs 1, 1, . . . and relay apparatus 3 connected to the communication line 2a, a message whose message ID is the smallest is transmitted at first. In addition, when any of the ECUs 1, 1, . . . and relay apparatus 3 connected to the communication line 2a are transmitting messages through the communication line 2a, the other ECUs 1, 1, . . . connected to the communication line 2a can simultaneously receive messages.

The ECUs 1, 1, . . . described above can cyclically transmit messages in accordance with the timer function implemented by the clocking unit 12. It is configured to set the cycle for each message. Thus, in the case that one ECU 1 transmits messages, a message may be cyclically transmitted every ten milliseconds and another message may be cyclically transmitted every twenty-five milliseconds. In addition, each of the ECUs 1, 1, . . . performs timing adjustment on message transmission in association with another ECU 1, as described later.

The relay apparatus 3 includes: a controlling unit 30 that consists of the CPU, MPU or the like and controls each component; a storing unit 31 that consists of a memory, such as an EEPROM or the flash memory; a temporary storing unit 32 that consists of a memory, such as a DRAM or SRAM; a clocking unit 33 that implements the timer function; a first communicating unit 34 that is connected to the communication line 2a; a second communicating unit 35 that is connected to the communication line 2b; and a determining unit 36 that monitors communication condition on the communication lines 2a, 2b and determines whether the transmission timing adjustment should be performed or not.

The controlling unit 30 is configured to obtain electric power from a power supply apparatus (not shown), such as a battery or alternator mounted on the car, for controlling each component.

The storing unit 31 stores a relay table 37 including message IDs that represent messages to be relayed, and the controlling unit 30 can refer the relay table 37 to perform the relay processing.

The temporary storing unit 32 temporarily stores information generated from the processing performed by the controlling unit 30, and is partially utilized as a buffer to store received messages for the relay processing.

The clocking unit 33 clocks elapsed time with a predetermined frequency. The controlling unit 30 can obtain time information from the clocking unit 33 at a predetermined timing.

The first communicating unit 34 and the second communicating unit 35 implement the message transmission with the ECUs 1, 1, . . . connected through the communication lines 2a, 2b to these communicating units 34, 35. In other words, these communicating units 34, 35 perform the message transmission based on the CAN protocol.

The determining unit 36 determines whether the transmission timing adjustment described later is required or not, in accordance with messages received by the first communicating unit 34 and the second communicating unit 35. When having determined that the transmission timing adjustment is required, the determining unit 36 informs the determination result to the controlling unit 30.

In the on-vehicle communication system described above, the ECUs 1, 1, . . . cyclically transmit messages at the transmission cycle that is previously set. In the case that an ECU 1 utilizes a start time for the transmission cycle and the start time is different from another start time utilized by another ECU 1, a transmission timing utilized by the ECU 1 is unlikely to overlap with another transmission timing utilized by another ECU 1. However, the start time utilized by the ECU 1 may be shifted due to the processing performed by the ECU 1, the transmission cycle utilized by the ECU 1 may be synchronized with another transmission cycle utilized by another ECU 1, and then, the transmission timing utilized by the ECU 1 may always overlap with another transmission timing utilized by another ECU 1. When the ECUs 1, 1, . . . connected to the same communication line 2a (or communication line 2b) have simultaneously tried to transmit messages, the collision may occur and the communication efficiency may be reduced. When the collision has occurred and there is a message whose transmission is deferred due to the lower priority, the transmission of deferred message may be further differed due to a later generated message that has a higher priority and is transmitted earlier than the deferred message. Thus, the delay may occur and the communication efficiency may be reduced. When the control is performed to prevent the transmission timing from overlapping with another transmission timing, the transmission is performed smoothly regardless of the degree of priority, and the communication efficiency is improved.

Because of the reasons described above, the on-vehicle communication system according to the embodiment 1 controls to make ECUs perform the adjustment in association with each other, prevents transmission timings of ECUs from overlapping with each other, and implements the uniform transmission having no bias, for improving the communication efficiency.

Each message is statically set to be transmitted by any of ECUs 1, 1, . . . , and to be received and utilized for the control by any of ECUs 1, 1, . . . . Each of ECUs 1, 1, . . . stores message IDs assigned to messages transmitted from itself, message IDs assigned to messages received by itself, transmission cycles and the like, in own storing unit 11. Each of ECUs 1, 1, . . . generates and transmits a message at the stored transmission cycle, in accordance with the timer function implemented by own clocking unit 12.

FIG. 3 is an explanation view showing an example of contents included in a message transmitted between the ECUs 1, 1, . . . that are connected to the communication line 2a according to the embodiment 1. The message transmitted between the ECUs 1, 1, . . . is assigned with a message ID based on the contents included in the message. In the explanation view of FIG. 3, "010", "200" and the like are assigned as the message IDs. In the explanation view of FIG. 3, each message ID is represented by eleven bits. For example, "010" represents "(0)000 0001 0000" with the hexadecimal number system, and "200" represents "(0)010 0000 0000" with the hexadecimal number system. Assume the case that the message ID is interpreted to be a numerical value. In the assumed case, a message having a smaller message ID is interpreted to have a higher priority. In short, the message having the message ID "010" has the highest priority in the explanation view of FIG. 3. In the explanation view of FIG. 3, the degree of priority is represented with numbers indicating the priority order.

Although a transmitted message may be received at the delayed time, each message is previously set to have or not to have the permission of delay in accordance of contents included in each message. In the example shown by the explanation view of FIG. 3, the message having the message ID "050 [i.e., (0)000 0101 0000]" has the permission of delay, but the message having the message ID "010" does not have the permission of delay.

In addition, each message is classified into a family A, family B or family C, in accordance with the contents included in each message. For example, ECUs 1, 1, . . . performing the body system control of a car are classified into a family regarding light parts, family regarding door parts, family regarding window parts and the like. Messages relating to the same family are likely utilized simultaneously. Therefore, a message relating to a family should be received by ECUs 1, 1, . . . at a timing as close as possible to another timing when another message relating to the same family is received by the ECUs 1, 1, . . . .

FIG. 4 is an explanation view showing an example of contents included in the relay table 37 according to the embodiment 1. As shown in FIG. 4, the relay table 37 includes message IDs representing messages to be relayed and information representing relay sources and relay destinations. The "relay source" is the communication line 2a or communication line 2b connected to the transmission source ECU 1 that has transmitted the message, and the "relay destination" is the communication line 2a or communication line 2b connected to the transmission destination ECU 1 that should receive the transmitted message. In the example shown by FIG. 4, "0 (zero)" represents the communication line 2a, and "1" represents the communication line 2b. When a message having a message ID "010" has been transmitted to the communication line 2a and has been received by the first communicating unit 34 included by the relay apparatus, the controlling unit 30 included by the relay apparatus 3 temporarily stores the received message in a buffer of the temporary storing unit 32, determines in reference with the relay table 37 that the received message should be relayed to the communication line 2b, and makes the second communicating unit 35 transmit the received message. The controlling unit 30 included in the relay apparatus 3 determines that it is not required to transmit a message having a message ID which is not included in the relay table 37.

The on-vehicle communication system according to the embodiment 1 classifies the messages shown in FIG. 3 into groups based on the degree of message priority, the presence of delay permission and the family, and makes apparatuses efficiently perform the transmission timing adjustment, in association with each other.

FIG. 5 is an explanation view showing an example of groups classified for performing the transmission timing adjustment according to the embodiment 1. The messages shown by FIG. 3 are classified in the example shown by FIG. 5.

In the example shown by FIG. 5, messages are classified into groups (1) to (4). Messages having message IDs "010", "020 [(0)000 0010 0000]" and "180 [(0)001 1000 0000]" are classified into the group (1), messages having message IDs "150 [(0)001 0101 0000]" and "200" are classified into the group (2), a message having a message ID "050" is classified into the group (3), and a message having a message ID "100 [(0)001 0000 0000]" is classified into the group (4). In FIG. 5, the "master message" means a message utilized as the standard of each group for performing the transmission timing adjustment described later, and the number of master message represents the priority order for becoming the master message. If a message having the highest priority cannot be transmitted due to, for example, a mechanical problem caused in an ECU 1 and the like, each ECU treats a message, as the master message, having the second highest priority in the group including messages to be transmitted by itself.

It will be described below how the messages in FIG. 5 are classified into the groups (1) to (4), respectively. At first, the messages are classified in accordance with the presence of delay permission. In view of the example shown by FIG. 3, messages having the message IDs "010", "020" and "150" are classified into a group including messages whose delays are not permitted, and messages having the message IDs "050", "100", "180" and "200" are classified into a group including messages whose delays are permitted, respectively.

Then, the classified messages whose delays are not permitted are further classified in accordance with the family. Thus, the messages whose delays are not permitted are respectively classified into a group (family C) including the message with the message IDs "010" and "040" and another group (family A) including the messages with the message ID "150".

Among the classified messages whose delays are permitted, a message having the largest message ID and the lowest priority is transferred into a group of messages which is classified in the same family but whose delays are not permitted. In this example, a message having the message ID "200" has the lowest priority among the classified messages whose delays are permitted and which are classified in the family A. A message having the message ID "150" is also classified in the same family A, and thus the message having the message ID "200" is transferred into the group including the message having the message ID "150". Then, a message having the message ID "180" has the second lowest priority among the classified messages whose delays are permitted and which are classified in the family C. Messages having the message IDs "010" and "020" are also classified in the same family C, and thus the message having the message ID "180" is transferred into the group including the messages having the message IDs "010" and "020".

Among the classified messages whose delays are permitted, the remaining messages are respectively classified into the final groups, other than the messages transferred due to the lowest priority into groups of message whose delays are not permitted. As the results, there are a group including only the message having the message ID "050" and another group including only the message having the message ID "100", too.

The master message is selected for each group from the classified messages whose delays are not permitted and which are classified in the same family. At that time, it is preferred to select the message as the master message which has the shortest transmission cycle in the same group, i.e., which has the highest priority in the same group (such a message generally does not have the delay permission). Therefore, it is possible to classify the messages into groups as shown in FIG. 5.

As the ECUs 1, . . . transmit messages in accordance with the groups of classified messages, the ECUs 1, 1, . . . performs the transmission timing adjustment in association with each other, to make the transmission timings of messages classified into a group become close to the transmission timing of the master message classified into the same group, and to make the transmission timing of the master message become far away from the other transmission timings of the other master messages.

Figure 6:
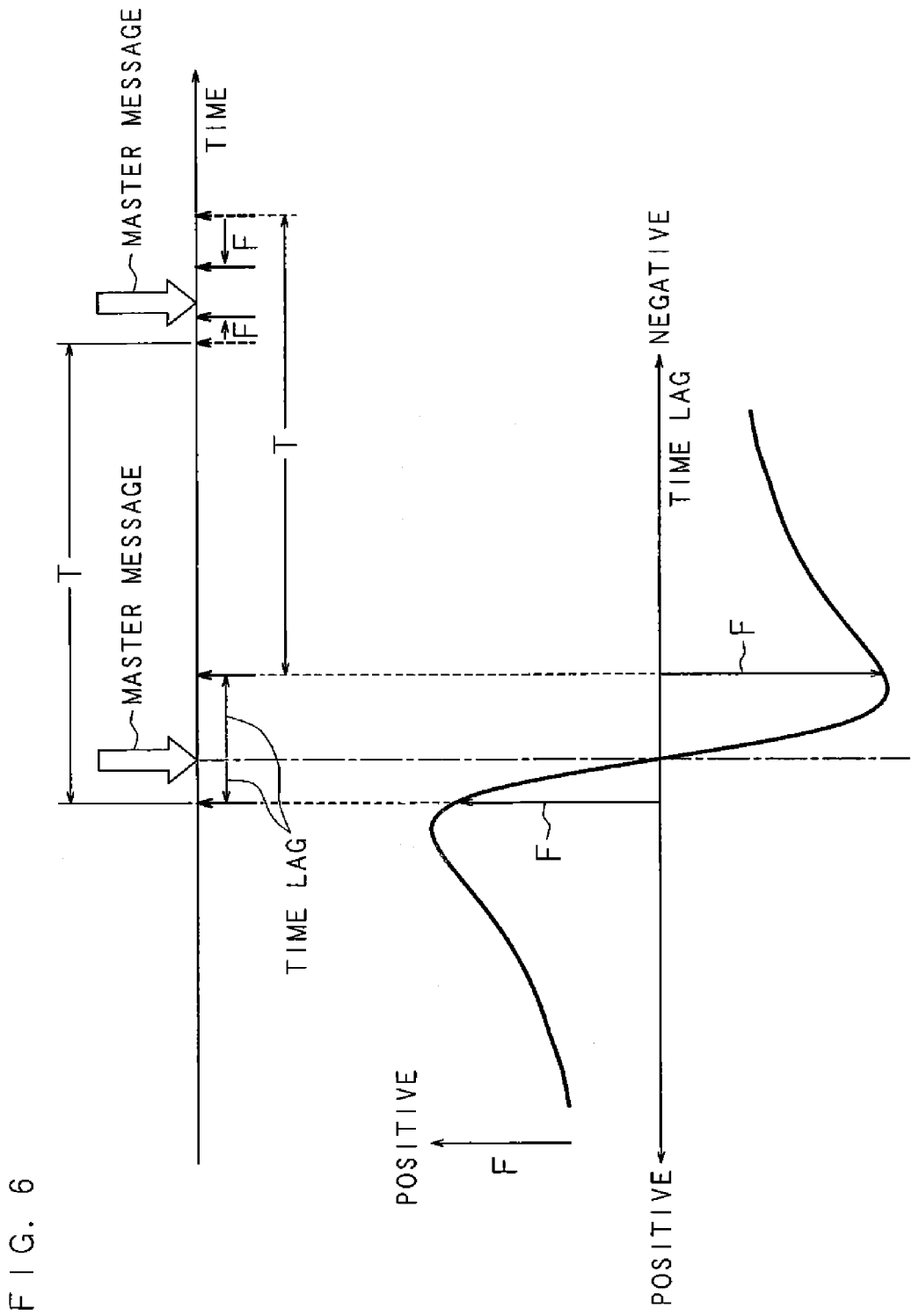
FIG. 6 is a simplified scheme for explaining a transmission timing adjustment performed by the ECU according to the embodiment 1.

FIG. 6 is a simplified scheme for explaining the transmission timing adjustment performed by the ECUs 1, 1, . . . according to the embodiment 1. The upper portion of FIG. 6 illustrates a relationship between the transmission timing of master message and the transmission timing of another message classified into a group including this master message. The bottom portion of FIG. 6 illustrates the magnitude of force (F) utilized for shifting the transmission timing of another message classified into a group including this master message closer to the transmission timing of this master message, in accordance with the time lag between the transmission time point of said another message and the transmission time point of this master message.

As shown in FIG. 6, ECUs 1, 1, . . . according to the embodiment 1 respectively perform the transmission timing adjustment based on the reference to the transmission timing of the master message. Each of ECUs 1, 1, . . . obtains the time lag (=[transmission time point of master message]−[transmission time point of message transmitted by itself]) that is the difference between the transmission time point of a message classified into a group and transmitted by itself and the transmission time point of the master message classified into the same group as that of the message transmitted by the ECU 1. With the obtained time lag and the equation (1) described below, each of ECUs 1, 1, . . . calculates the magnitude of force F, adds the calculated magnitude of force F to the next transmission timing and then transmits the next message with the changed next transmission timing. In the equation (1), the "r" represents time lag, the "G" represents a predetermined constant number, and the "g" represents a predetermined constant number.

[Equation 1]

$$F(r) = \frac{2 \cdot G \cdot r}{(r^2 + g^2)} \quad (1)$$

In the case that the time point of a message transmitted by itself is earlier than the transmission time point of the master message (left arrow in the upper portion of FIG. 6), the magnitude of force F is a positive value. Thus, the next transmission timing is delayed by a period corresponding to the magnitude of force F. In the contrary case that the time point of a message transmitted by itself is later than the transmission time point of the master message (right arrow in the upper portion of FIG. 6), the magnitude of force F is a negative value. Thus, the next transmission timing is advanced by a period corresponding to the magnitude of force F. Although a significant larger magnitude of force does not affect even in the case according to the embodiment 1 that there is a significant large time lag between the time point of a message transmitted by itself and the transmission time point of the master, the time point of a message transmitted by itself is changed closest to the transmission time point of the master in the case that the time lag becomes a predetermined period.

As the ECUs 1, 1, . . . described above respectively transmit the message classified into a group including the master message, the ECUs 1, 1, . . . respectively advance or delay the next transmission timing by the period corresponding to the magnitude force F calculated from the time lag between the time point of a message transmitted by themselves and the transmission time point of the master, in order to make the next transmission timing become close to the transmission timing of the master message.

Figure 7A:
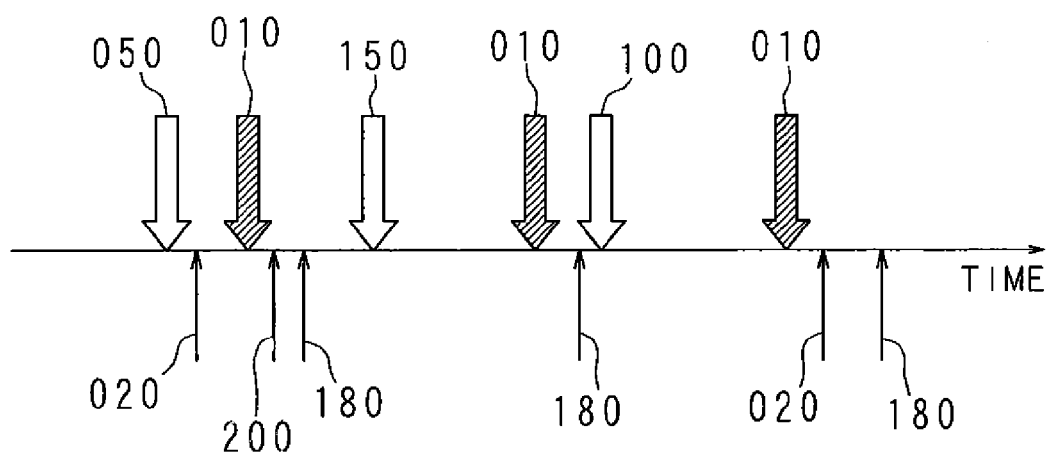
FIG. 7A shows a time distribution based on time points for transmitting respective messages before the ECU performs the transmission timing adjustment according to the embodiment 1.
Figure 7B:
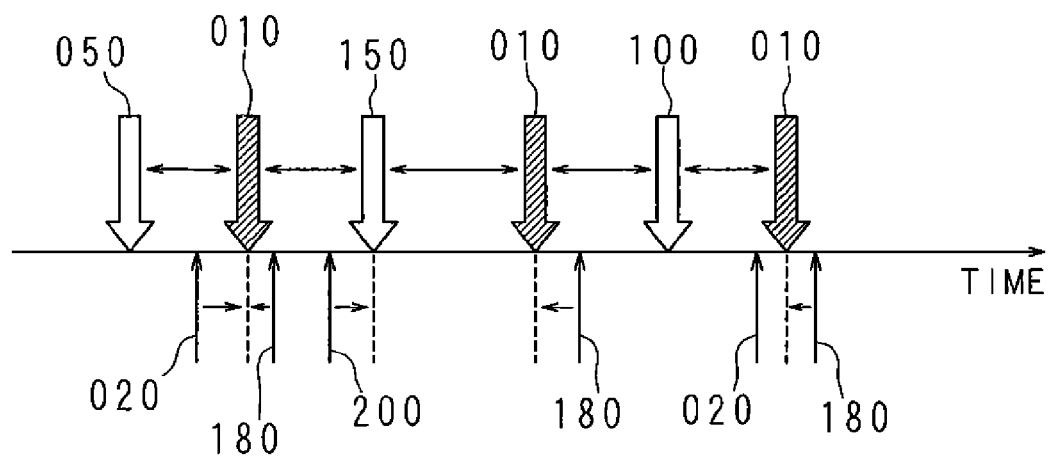
FIG. 7B shows a time distribution based on time points for transmitting respective messages after the ECU performs the transmission timing adjustment according to the embodiment 1.

FIG. 7A and FIG. 7B are explanation views schematically showing an example of results obtained by the transmission timing adjustment performed by the ECUs 1, 1, . . . according to the embodiment 1. FIG. 7A illustrates a time distribution based on time points for transmitting respective messages before the transmission timing adjustment is performed, and FIG. 7B illustrates the time distribution after the transmission timing adjustment is performed. In FIG. 7A and FIG. 7B, the horizontal axis represents a temporal axis, and each arrow represents a transmission time point of a message. The transmission time point of a master message is illustrated above the horizontal axis, and the transmission time point of the other message is illustrated under the horizontal axis.

In the example shown in FIG. 7A, the message having the message ID "010" is transmitted several times (hatched arrows). At the left side of FIG. 7A, a transmission time point of the message having the message ID "180" is close to transmission time points of the messages respectively having the message IDs "050", "020", "200", "180" and "150". The time lag between the transmission time point of the message having the message ID "150" and the second transmission time point of the message having the message ID "010" and the time lag between the transmission time point of the message having the message ID "100" and the third transmission time point of the message having the message ID "010" are relatively larger. Thus, it looks that the bias occurs in the timings of messages respectively transmitted from the ECUs 1, 1, . . . .

In the example shown in FIG. 7B, it contrarily looks that the transmission timings are substantially uniformed for the master messages having the message IDs "050", "010", "150" and "100" because of the transmission timing adjustment performed in order to make the transmission timings become far from each other. Further, the messages having the message IDs "020" and "180" are respectively shifted to become closer to the transmission timing of the message having the message ID "010" classified in the same group as the messages having the message IDs "020" and "180". In other words, the adjustment is performed to be able to receive the messages classified in the same group during the narrower time period. Furthermore, the transmission timing of the message having the message ID "200" is shifted to become closer to the transmission timing of the master message having the message ID "150".

As described above, the transmission timings are adjusted in association with each other by each of ECUs 1, 1, . . . . Therefore, it is possible to reduce the communication collision on the communication line 2a and to improve the communication efficiency.

However, in the case that ECUs 1, 1, . . . constantly perform the processing described above, larger processing loads are given to the ECUs 1, 1, . . . . The larger processing loads are contrary to the object reducing the processing load of ECUs 1, 1, . . . . Especially for the ECUs 1, 1, . . . mounted on a car, it is desired to simplify the components, such as a reduction of memory. Thus, the processing should be simplified, and the processing load should be reduced.

Hence, in the on-vehicle communication system according to the embodiment 1, the relay apparatus 3 determines whether the timing adjustment should be performed for the transmission between the ECUs 1, 1, . . . or not and instructs to each ECU 1, 1, . . . in accordance with the determination result, before the each ECUs 1, 1, . . . performs the timing adjustment described above. Then, an instructed ECU 1 performs the timing adjustment. The determination whether the timing adjustment should be performed is performed in accordance with the time distribution about the number of messages transmitted on the communication lines 2a, 2b. For each base time interval, the relay apparatus 3 counts the number of messages transmitted during a monitoring period divided into plural base time intervals. The relay apparatus 3 determines that the transmission timing adjustment should be performed, when the communication is not efficient, e.g., when the bias occurs in the message transmission timings. Then, the relay apparatus 3 instructs the ECUs 1, 1, . . . to perform the transmission timing adjustment. The relay apparatus 3 monitors all messages transmitted from ECUs 1, 1, . . . for performing the replay processing, and relays a message to be relayed. Therefore, the processing load hardly becomes significantly larger even in the case that the relay apparatus 3 is configured to observe the time distribution for all messages.

It will be described below in reference to a flowchart about the message observation processing and adjustment requirement determination processing performed by the relay apparatus 3.

Figure 8:
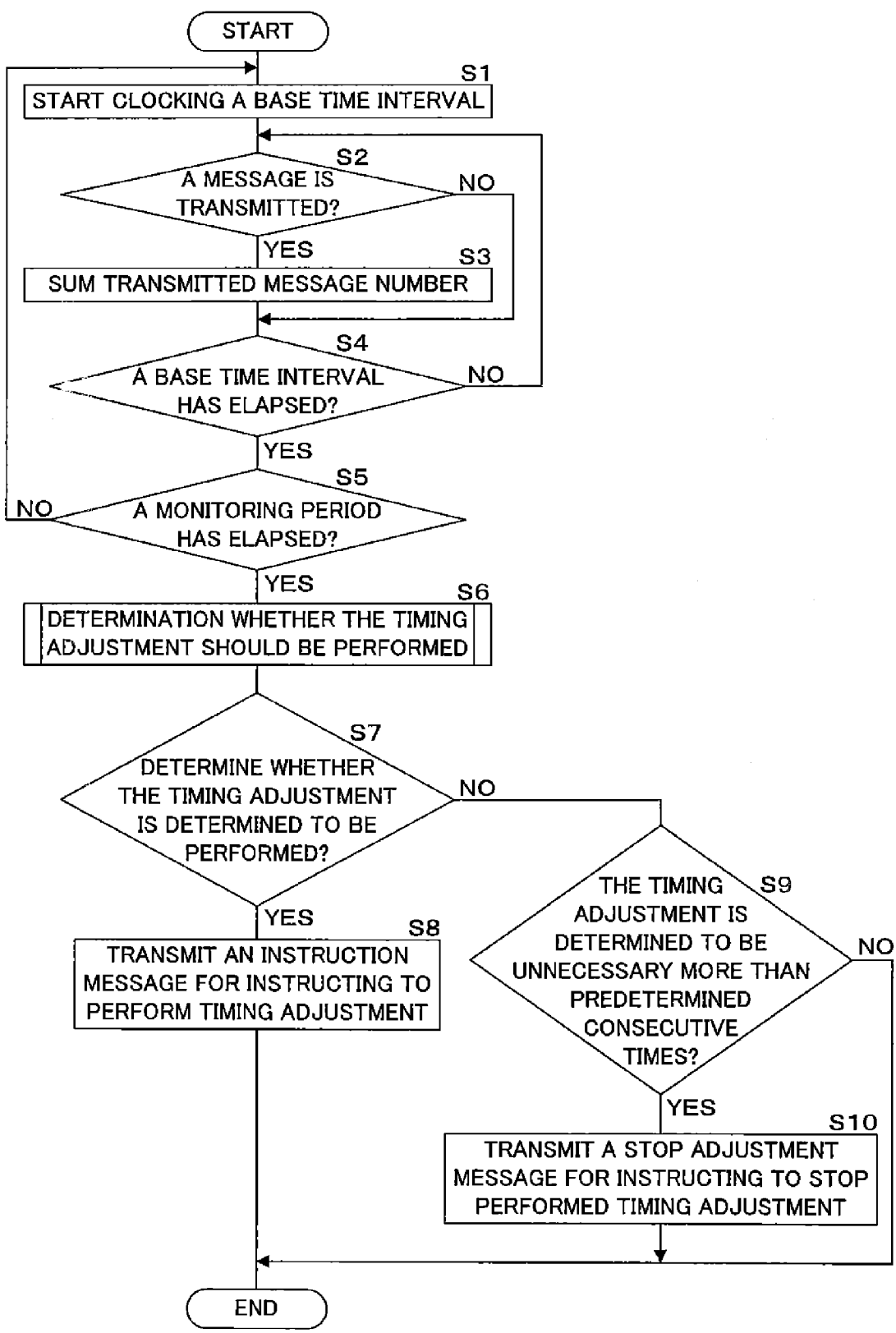
FIG. 8 is a flowchart showing an example of a procedure regarding a message observation processing and an adjustment requirement determination processing performed by a controlling unit included in a relay apparatus according to the embodiment 1.

FIG. 8 is the flowchart showing an example of a procedure regarding the message observation processing and the adjustment requirement determination processing performed by the controlling unit 30 included in the relay apparatus 3 according to the embodiment 1. The controlling unit 30 utilizes the timer function implemented by the clocking unit 33 to start clocking the monitoring period, and then utilizes the determining unit 36 to determine whether the adjustment should be performed, while counting the message number.

Based on the timer function implemented by the clocking unit 33, the controlling unit 30 starts clocking a base time interval (step S1), and determines whether a message is transmitted to the communication line 2a (or the communication line 2b) during the base time interval or not (step S2). At that time, a message transmitted by itself for performing the relay processing is also included in the transmitted message for determination.

When having determined that a message is transmitted (step S2: YES), the controlling unit 30 sums the number of messages transmitted during the base time interval (step S3), and determines whether the base time interval has elapsed or not (step S4). The controlling unit 30 stores the number of messages transmitted during the base time interval summed at the step S3 into the storing unit 31. Alternatively, the controlling unit 30 may be configured to stores the summed number of messages in a memory included by the controlling unit 30.

When having determined at the step S2 that a message is not transmitted (S2: NO), the controlling unit 30 proceeds the procedure to the step S4 and determines whether the base time interval has elapsed or not (S4).

When having determined that the base time interval has not elapsed yet (S4: NO), the controlling unit 30 returns the procedure to the step S2 and determines whether another message is transmitted or not (S2). When having determined that the base time interval has elapsed (S4: YES), the controlling unit 30 determines whether the monitoring period has elapsed or not (step S5). When having determined that the monitoring period has not elapsed yet (S5: NO), the controlling unit 30 returns the procedure to the step S1 and starts clocking the next base time interval in order to count the number of messages transmitted during the next base time interval (S1).

When having determined at the step S5 that the monitoring period has elapsed (S5: YES), the controlling unit 30 makes the determining unit 36 determine in accordance with the number of messages transmitted during the next time interval included in the monitoring period whether the timing adjustment should be performed for messages transmitted between the ECUs 1, 1, . . . (step S6).

The controlling unit 30 determines whether the timing adjustment is determined at the step S6 to be performed (step S7). When having determined that the timing adjustment is determined at the step S6 (S7: YES), the controlling unit 30 generates an instruction message for instructing to perform the timing adjustment, makes the first communicating unit 34 or second communicating unit 35 transmit the generated instruction message to the communication line 2a or communication line 2b (step S8), and then completes the procedure.

When having determined that the timing adjustment is determined at the step S6 not to be performed (S7: NO), the controlling unit 30 determines whether the timing adjustment is determined to be unnecessary more than predetermined consecutive times (step S9). When having determined that the timing adjustment is determined to be unnecessary less than the predetermined consecutive times (S9: NO), the controlling unit 30 then completes the procedure.

When having determined that the timing adjustment is determined to be unnecessary the predetermined consecutive times or more (S9: YES), the controlling unit 30 generates a stop adjustment message for instructing to stop the timing adjustment performed for the ECUs 1, 1, . . . , makes the first communicating unit 34 or second communication unit 35 transmit the generated stop adjustment message to the communication line 2a or communication line 2b (step S10) and completes the procedure.

When the instruction message has been transmitted to the communication line 2a (or communication line 2b), each of the ECUs 1, 1, . . . connected to the communication line 2a receives the transmitted instruction message through own communicating unit 13, starts performing the transmission timing adjustment described above, and keeps performing the transmission timing adjustment until receiving the stop adjustment message (see FIG. 7).

FIG. 9 is a flowchart showing an example of a procedure regarding the adjustment requirement determination processing performed by the determining unit 36 included in the relay apparatus 3 according to the embodiment 1. The procedure described below explains in detail about the determination at the step S6 in the flowchart of FIG. 8 whether the transmission timing adjustment should be performed or not.

The determining unit 36 identifies the counted number of messages transmitted during each base time interval divided from the monitoring period (step S611). As the counted message number for each base time interval is stored in the storing unit 31 or in the memory included by the controlling unit 30, the determining unit 36 refers the stored message number to perform the processing.

The determining unit 36 determines whether a number of base time intervals during which no message is transmitted is more than a predetermined number among the base time intervals for which the counted message number is identified at the step S611 (step S612). When having determined that the number of base time intervals is more than the predetermined number (S612: YES), the determining unit 36 determines that the timing adjustment should be performed for the messages transmitted between the ECUs 1, 1, . . . (step S613), and returns the procedure to the step S7 shown in the flowchart of FIG. 8.

When having determined that the number of base time intervals is less than the predetermined number (S612: NO), the determining unit 36 determines that it is not required to perform the transmission timing adjustment (step S614), and returns the procedure to the step S7 shown in the flowchart of FIG. 8.

Figure 10:
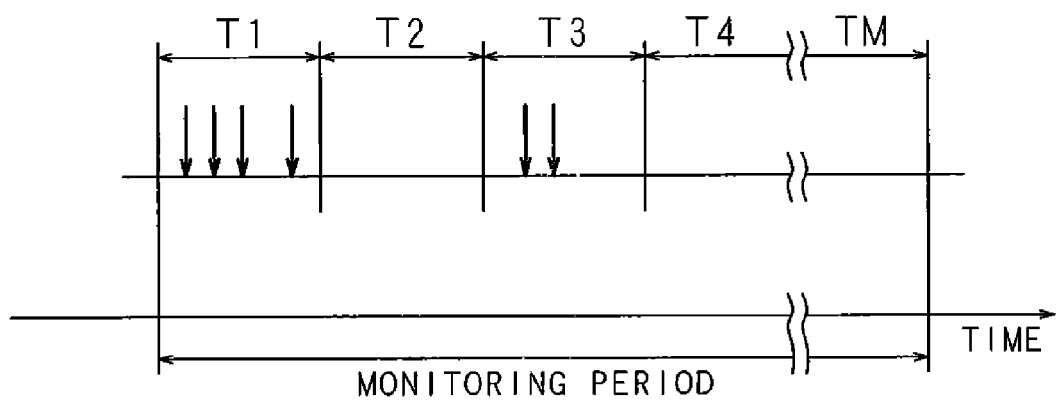
FIG. 10 is a view for explaining an example of the determination processing performed by the determining unit according to the embodiment 1.

FIG. 10 is a view for explaining an example of the determination processing performed by the determining unit 36 according to the embodiment 1. In FIG. 10, the horizontal axis represents a temporal axis, each arrow represents a time point of a message transmitted during a base time interval included in the monitoring period, and the time distribution is illustrated for the number of messages counted during the monitoring period.

The monitoring period is divided into "M" numbers of base time interval T1, T2, . . . , TM. For example, the base time interval is the greatest common divisor of transmission cycles regarding transmitted messages, or the shortest time interval among all the transmission cycles. For example, the monitoring period is longest time interval among all the transmission cycles.

Message numbers counted by the controlling unit 30 are represented to be "N1", "N2", . . . "NM" for the base time intervals T1, T2, . . . , TM, respectively. In the example of FIG. 10, the "N2" is zero and the "N4" is also zero. In the case that the predetermined number is configured to be "2" for the determining unit 36 determining whether the number of base time intervals during which no message is transmitted is more than the predetermined number, it is determined in the example of FIG. 10 that the transmission timing adjustment should be performed (S612: YES, and S613 in FIG. 9). Then, the controlling unit 30 included by the relay apparatus 3 transmits the instruction message to instruct performing the timing adjustment, and the timing adjustment is performed by each of the ECUs 1, 1, . . . in order to alleviate the bias of transmission timings.

As described above, each of ECUs 1, 1, . . . connected to the communication lines 2a, 2b performs the transmission timing adjustment in association with each other in the on-vehicle communication system according to the embodiment 1. Therefore, it is possible to reduce the communication collision on the communication lines 2a, 2b, and to improve the communication efficiency. In addition, the relay apparatus 3 monitors messages transmitted from respective ECUs 1, 1, . . . that are connected to the communication lines 2a, 2b for performing the relay processing, observes the communication condition on the communication lines 2a, 2b, and transmits the instruction message for instructing respective ECUs 1, 1, . . . to perform the transmission timing adjustment only when it is determined that the bias has occurred in the timings of messages transmitted from the ECUs 1, 1, . . . . Hence, it is enough for each of ECUs 1, 1, . . . to perform the timing adjustment after receiving the instruction message. In other words, it is not required for each of ECUs 1, 1, . . . to perform the constant processing regarding the timing adjustment. Therefore, it is possible to reduce the processing load and to implement the efficient processing.

(Embodiment 2)

In the embodiment 1, the bias of transmission timing is considered in accordance with the determination whether the number of base time intervals during which no message is transmitted is more than the predetermined number among the plural base time intervals included in the monitoring period, and then the requirement of transmission timing adjustment for ECUs 1, 1, . . . is determined in accordance with the consideration. In the case of an embodiment 2, however, it is considered that the bias occurs in the timings of messages transmitted from ECUs 1, 1, . . . when the number of messages transmitted during a base time interval is over the limitation, and then it is, determined in accordance with the consideration that transmission timing adjustment should be performed.

The hardware configuration of the on-vehicle communication system according to the embodiment 2 is similar to the hardware configuration according to the embodiment 1, thus the same numerals are provided to the same configuration according to the embodiment 2 which is not explained in detail. In addition, the embodiment 2 performs the transmission timing adjustment with ECUs 1, 1, . . . and the message number observation processing with the controlling unit 30 included by the relay apparatus 3, which are similar to those of embodiment 1 and thus not explained in detail. The following description explains in detail about the adjustment requirement determination processing performed by the determining unit 36, which is different from the embodiment 1.

Figure 11:
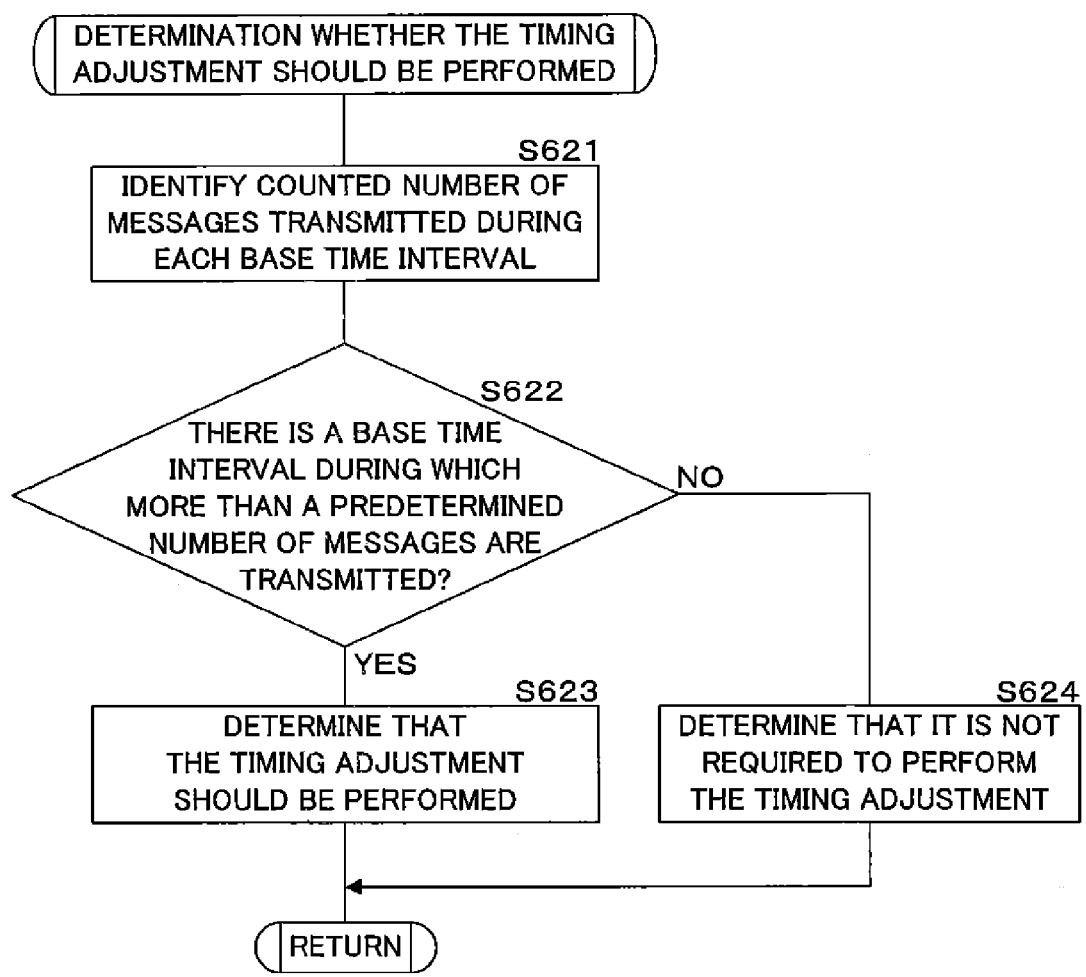
FIG. 11 is a flowchart showing an example of a procedure regarding the adjustment requirement determination processing performed by the determining unit included in the relay apparatus according to an embodiment 2.

FIG. 11 is a flowchart showing an example of a procedure regarding the adjustment requirement determination processing performed by the determining unit 36 included in the relay apparatus 3 according to the embodiment 2. The following procedure corresponds to another example of the determination at the step S6 in the flowchart of FIG. 8 whether the transmission timing adjustment should be performed or not.

The determining unit 36 identifies the message number counted for each base time interval divided from the monitoring period (step S621). As the counted message number for each base time interval is stored in the storing unit 31 or in the memory included by the controlling unit 30, the determining unit 36 refers the stored message number to perform the processing.

The determining unit 36 determines whether there is a base time interval during which more than a predetermined number of messages are transmitted among the base time intervals whose message numbers are identified at the step S621 (step S622). When having determined that there is the base time interval during which more than the predetermined number of messages are transmitted (S622: YES), the determining unit 36 determines that the timing adjustment of messages transmitted between the ECUs 1, 1, . . . should be performed (step S623), and returns the procedure to the step S7 in the flowchart of FIG. 8.

When having determined that there is no base time interval during which more than the predetermined number of messages are transmitted (S622: NO), the determining unit 36 determines that the message timing adjustment should not be performed (step S623), and returns the procedure to the step S7 in the flowchart of FIG. 8.

In the determination processing at the step S622, it is determined whether there is a base time interval during which more than a predetermined number of messages are transmitted or not. The "predetermined number" herein is a number corresponding to a predetermined ratio (e.g., 80%) to the theoretical number of messages transmittable during the base time interval which is estimated from the communication speed of communication lines 2a, 2b and size of messages (e.g., number of bytes, number of bits and the like). Thus, when there is a base time interval during which transmittable numbers of messages are transmitted, i.e., during which messages are transmitted with almost the maximum frequencies, it is considered that the bias has occurred in the transmission timings and then it is determined that the timing adjustment should be performed.

FIG. 12 is a view for explaining an example of the determination processing performed by the determining unit 36 according to the embodiment 2. In FIG. 12 similarly to FIG. 10 according to the embodiment 1, the horizontal axis represents a temporal axis, each arrow represents a time point of a message transmitted during a base time interval included in the monitoring period, and the time distribution is illustrated for the number of messages counted during the monitoring period.

In the example of FIG. 12, the controlling unit 30 counts the messages numbers N1, N2, . . . , NM for the base time intervals T1, T2, . . . , TM, respectively. It is assumed that the message number N2 for the base time interval T2 is more than a predetermined number. In this assumed case, the determining unit 36 determines that the transmission timing adjustment should be performed after determining whether there is a base time interval during which the number of transmitted message is more than a predetermined number (S622: YES and S623 in FIG. 11). Then, the controlling unit 30 included by the relay apparatus 3 transmits the instruction message instructing to perform the timing adjustment, and the timing adjustment is performed on messages transmitted between the ECUs 1, 1, . . . to alleviate the bias of transmission timings.

As described above, the on-vehicle communication system according to the embodiment 2 also makes the relay apparatus 3 properly determine whether the transmission timing adjustment should be performed or not. Therefore, it is possible to reduce the processing load on each of ECUs 1, 1, . . . caused by the performance of transmission timing adjustment, to reduce the communication collision on the communication lines 2a, 2b and to improve the communication efficiency.

(Embodiment 3)

In the embodiment 1, the bias of transmission timing is considered in accordance with the determination whether the number of base time intervals during which no message is transmitted is more than the predetermined number among the plural base time intervals included in the monitoring period, and then the requirement of transmission timing adjustment for ECUs 1, 1, . . . is determined in accordance with the consideration. In the case of an embodiment 3, however, it is considered that the bias occurs in the timings of messages transmitted from ECUs 1, 1, . . . when the maximum value in the message numbers for plural base time intervals is more than predetermined-folds of the minimum value in the message numbers for plural base intervals, and then it is determined in accordance with the consideration that transmission timing adjustment should be performed.

The hardware configuration of the on-vehicle communication system according to the embodiment 3 is similar to the hardware configuration according to the embodiment 1, thus the same numerals are provided to the same configuration according to the embodiment 3 which is not explained in detail. In addition, the embodiment 3 performs the transmission timing adjustment with ECUs 1, 1, . . . and the message number observation processing with the controlling unit 30 included by the relay apparatus 3, which are similar to those of embodiment 1 and thus not explained in detail. The following description explains in detail about the adjustment requirement determination processing performed by the determining unit 36, which is different from the embodiment 1.

Figure 13:
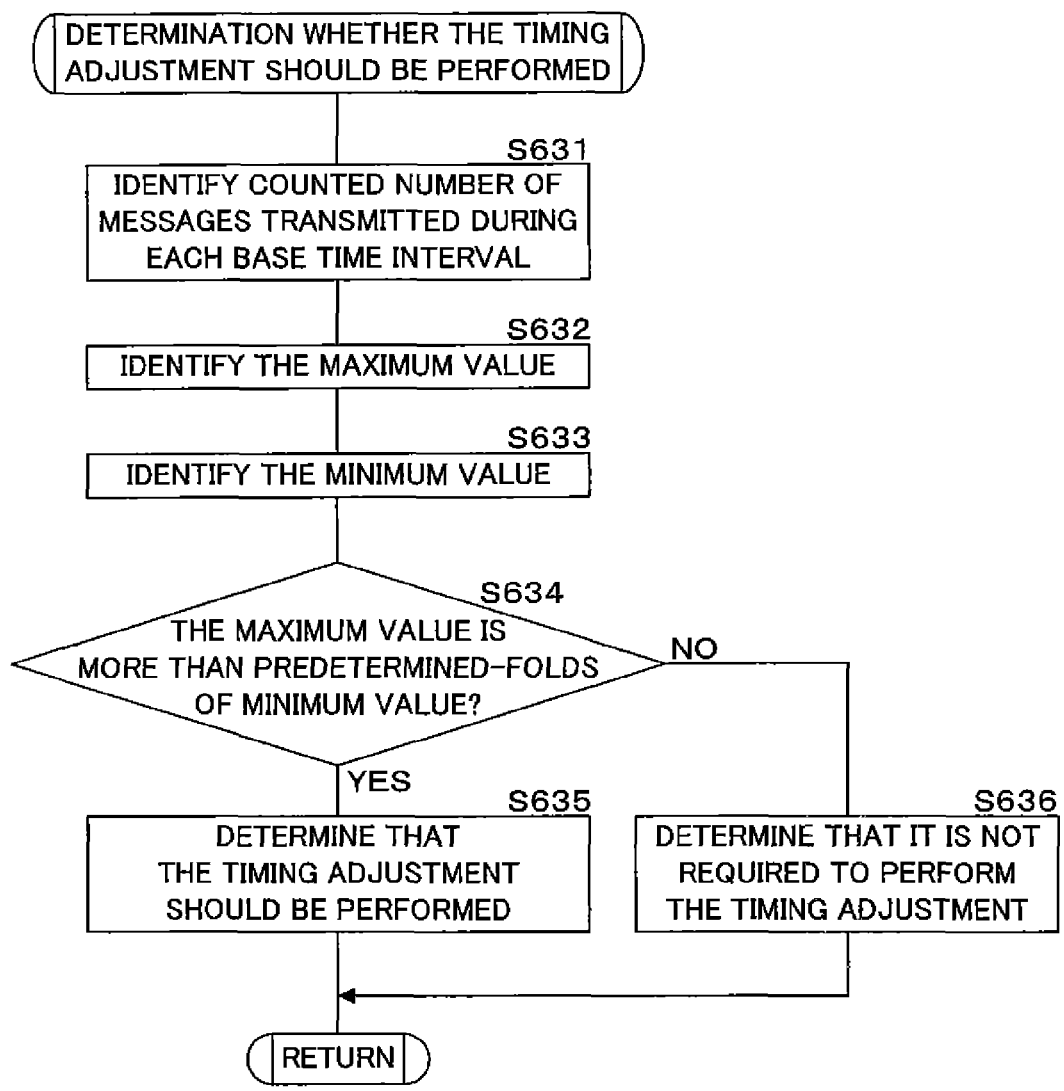
FIG. 13 is a flowchart showing an example of a procedure regarding the adjustment requirement determination processing performed by the determining unit included in the relay apparatus according to an embodiment 3.

FIG. 13 is a flowchart showing an example of a procedure regarding the adjustment requirement determination processing performed by the determining unit 36 included in the relay apparatus 3 according to the embodiment 3. The following procedure corresponds to another example of the determination at the step S6 in the flowchart of FIG. 8 whether the transmission timing adjustment should be performed or not.

The determining unit 36 identifies the message number counted for each base time interval divided from the monitoring period (step S631). As the counted message number for each base time interval is stored in the storing unit 31 or in the memory included by the controlling unit 30, the determining unit 36 refers the stored message number to perform the processing.

Then, the determining unit 36 identifies the maximum value and minimum value in the message numbers for plural base intervals identified at the step S631 (step S632 and step S633). Based on the maximum value and minimum value identified at the step S632 and step S633, the determining unit 36 determines whether the maximum value is more than predetermined-folds of the minimum value or not (step S634). When having determined that the maximum value is equal to or more than predetermined-folds of the minimum value (S634: YES), the determining unit 36 determines that transmission timing adjustment should be performed for the ECUs 1, 1, . . . (step S635) and returns the procedure to the step S7 in the flowchart of FIG. 8.

When having determined that the maximum value is less than predetermined-folds of the minimum value (S634: NO), the determining unit 36 determines that the message timing adjustment is not required (step S636), and returns the procedure to the step S7 in the flowchart of FIG. 8.

FIG. 14 is a view for explaining an example of the determination processing performed by the determining unit 36 according to the embodiment 3. In FIG. 14 similarly to FIG. 10 according to the embodiment 1, the horizontal axis represents a temporal axis, each arrow represents a time point of a message transmitted during a base time interval included in the monitoring period, and the time distribution is illustrated for the number of messages counted during the monitoring period.

In the example of FIG. 14, the controlling unit 30 counts the messages numbers N1, N2, . . . , NM for the base time intervals T1, T2, . . . , TM, respectively. It is assumed that the message number N2 for the base time interval T2 is identified as the maximum value and the message number N3 for the base time interval T3 is identified as the minimum value. The determining unit 36 determines whether the maximum value of message numbers is more than the predetermined-folds of the minimum value. In an example case that the "predetermined-folds" is set to be "five-folds" herein, the determining unit 36 determines that the transmission timing adjustment should be performed (S634: YES, and S635 in FIG. 13). Then, the controlling unit 30 included by the relay apparatus 3 transmits the instruction message instructing to perform the timing adjustment, and the timing adjustment is performed on messages transmitted between the ECUs 1, 1, . . . to alleviate the bias of transmission timings.

As described above, the on-vehicle communication system according to the embodiment 3 also makes the relay apparatus 3 properly determine whether the transmission timing adjustment should be performed or not, on the basis of the transmission timings. Therefore, it is possible to reduce the processing load on each of ECUs 1, 1, . . . caused by the performance of transmission timing adjustment, to reduce the communication collision on the communication lines 2a, 2b and to improve the communication efficiency.

In the embodiments 1-3, the relay apparatus 3 is configured to measure the timings of messages transmitted by the ECUs 1, 1, . . . . However, another apparatus but not the relay apparatus 3 may measure the transmission timings and transmit the instruction message, alternatively. Because the relay apparatus 3 is typically configured for performing the relay processing to receive all messages transmitted from the ECUs connected to the communication line 2a and to relay the received messages to the communication line 2b in accordance with the message IDs provided to the received messages, the embodiments 1-3 are configured to make the relay apparatus 3 measure the transmission timings. Even when the relay apparatus 3 is made to perform the additional functions, such as the adjustment requirement determination processing and instruction message transmission processing described above, the relay apparatus 3 can implement the additional functions without improving the performance level of relay apparatus 3 and further, the additional functions do not cause significantly larger processing loads on the relay apparatus 3. Thus, such a configuration is preferable. In addition, because the relay apparatus 3 is connected to plural communication lines 2a, 2b for performing the relay processing, the single relay apparatus 3 can perform the adjustment requirement determination processing and instruction message transmission processing not only on the communication line 2a but also on the communication line 2b. However, the present invention is not limited to such a configuration. Alternatively, it may be configured to prepare an apparatus that performs the adjustment requirement determination processing and instruction message transmission processing on the communication line 2a, to prepare another apparatus that performs the adjustment requirement determination processing and instruction message transmission processing on the communication line 2b, and to respectively connect these apparatuses to the communication lines 2a, 2b with the bus topology. These apparatus may be prepared only for performing the processing regarding the transmission timing adjustment, or any of ECUs 1, 1, . . . respectively connected to the communication lines 2a, 2b may be utilized as these apparatuses described above for performing the adjustment requirement determination processing and instruction message transmission processing.

(Embodiment 4)

As the relay apparatus 3 is connected to the communication lines 2a, 2b and relays a message between the communication lines 2a, 2b in an embodiment 4, the relay apparatus 3 performs the transmission timing adjustment. CAN communication performs the arbitration processing based on the message ID for implementing the message transmission. Because the arbitration processing is performed on the communication line 2a independently from the communication line 2b, a message relayed from the communication line 2a may be defeated consecutively on the communication line 2b against other messages having higher priorities. When further messages to be relayed are successively transmitted on the communication line 2a in such a case, the relay apparatus 3 holds the messages that cannot be relayed to the communication line 2b. Thus, the embodiment 4 described below makes a relay apparatus 4 determine whether the transmission timing adjustment should be performed or not and adequately perform the transmission timing adjustment, in order to prevent the message hold caused by the relay apparatus 3 from becoming more increased.

The configuration of the on-vehicle communication system according to the embodiment 4 is similar to the configuration according to the embodiment 1, except for the configuration regarding the relay apparatus 4. Thus, the same numerals are provided to the same configuration according to the embodiment 4 which is not explained in detail. The configuration parts different from those of the embodiment 1 will mainly be described here.

Figure 15:
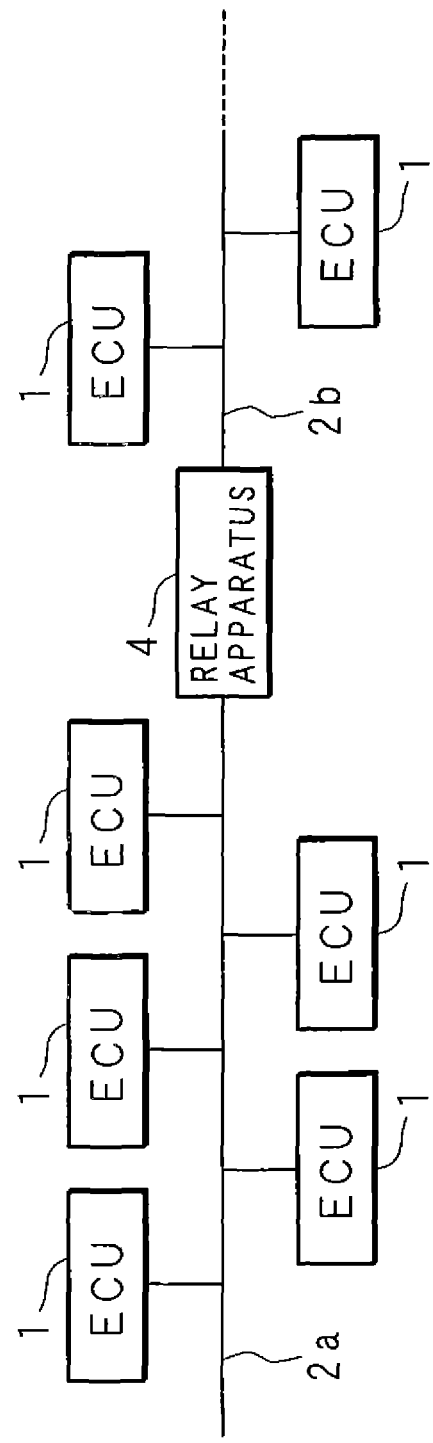
FIG. 15 is a view showing a configuration of the on-vehicle communication system according to an embodiment 4.

FIG. 15 is a view showing a configuration of the on-vehicle communication system according to the embodiment 4. The on-vehicle communication system includes: the ECUs 1, 1, . . . that are apparatuses transmitting messages; the communication lines 2a, 2b, each of which is connected to a group of ECUs 1, 1, . . . ; and a relay apparatus 4 that is connected to the communication lines 2a, 2b and relays data transmitted between the ECUs 1, 1, . . . . The relay apparatus 4 is also connected to the communication lines 2a, 2b with the bus topology, and can receive all messages transmitted through the communication lines 2a, 2b.

Figure 16:
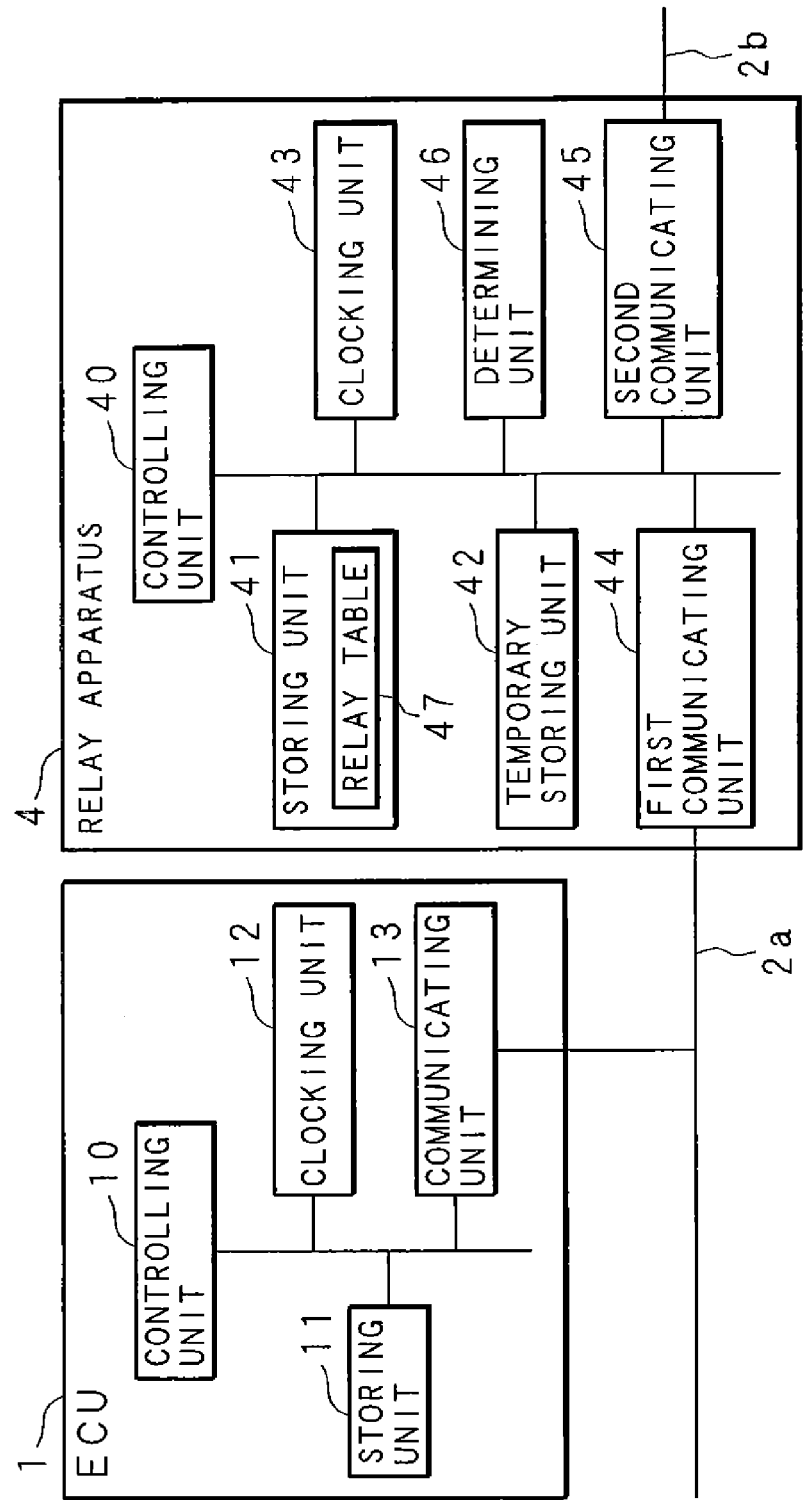
FIG. 16 is a block diagram showing components included in the ECU and the relay apparatus that configure the on-vehicle communication system according to the embodiment 4.

FIG. 16 is a block diagram showing components included in the ECU 1 and the relay apparatus 4 that configure the on-vehicle communication system according to the embodiment 4. The relay apparatus 4 includes: a controlling unit 40 that consists of the CPU, MPU or the like and controls each component; a storing unit 41 that consists of a memory, such as an EEPROM or the flash memory; a temporary storing unit 42 that consists of a memory, such as a DRAM or SRAM; a clocking unit 43 that implements the timer function; a first communicating unit 44 that is connected to the communication line 2a; a second communicating unit 45 that is connected to the communication line 2b; and a determining unit 46 that monitors communication condition on the communication lines 2a, 2b and determines whether the transmission timing adjustment should be performed or not.

The controlling unit 40 is configured to obtain electric power from the power supply apparatus (not shown), such as a battery or alternator mounted on the car, for controlling each component.

The storing unit 41 stores a relay table 47 including message IDs that represent messages to be relayed, and the controlling unit 40 can refer to the relay table 47 to perform the relay processing.

The temporary storing unit 42 temporarily stores information generated from the processing performed by the controlling unit 40, and is partially utilized as a relay buffer to temporarily store messages received for the relay processing. At that time, the messages to be relayed is stored in the buffer with the first in first out (FIFO) method, read out and transmitted from the buffer.

The clocking unit 43 clocks elapsed time with a predetermined frequency. The controlling unit 40 can obtain time information from the clocking unit 43 at a predetermined timing.

The first communicating unit 44 and the second communicating unit 45 implement the message transmission with the ECUs 1, 1, . . . connected through the communication lines 2a, 2b to these communicating units 44, 45. In other words, these communicating units 44, 45 perform the message transmission based on the CAN protocol.

The determining unit 46 determines whether the buffer of temporary storing unit 32 has stored a message that is received from one of the ECUs 1, 1, . . . through the communication line 2a or communication line 2b and that is not relayed yet. When having determined that the buffer of temporary storing unit 32 has stored such a message, the determining unit 46 informs the determination result to the unit 40.

In the on-vehicle communication system described above, the ECUs 1, 1, . . . cyclically transmits messages at the transmission cycle that is previously set. In the case that an ECU 1 utilizes a start time for the transmission cycle and the start time is different from another start time utilized by another ECU 1, a transmission timing utilized by the ECU 1 is unlikely to overlap with another transmission timing utilized by another ECU 1. However, the start time utilized by the ECU 1 may be shifted due to the processing performed by the ECU 1, the transmission cycle utilized by the ECU 1 may be synchronized with another transmission cycle utilized by another ECU 1, and then, the transmission timing utilized by the ECU 1 may always overlap with another transmission timing utilized by another ECU 1. When the ECUs 1, 1, . . . connected to the same communication line 2a (or communication line 2b) have simultaneously tried to transmit messages, the collision may occur and the communication efficiency may be reduced. When the collision has occurred and there is a message whose transmission is deferred due to the lower priority, the transmission of deferred message may be further differed due to a later generated message that has a higher priority and is transmitted earlier than the deferred message. Thus, the delay may occur and the communication efficiency may be reduced.

In addition, when a message has the highest priority in messages to be transmitted from the ECUs 1, 1, . . . that are connected to the communication line 2a and the message is transmitted to the communication line 2a to be relayed toward the communication line 2b from the ECUs 1, 1, . . . that are connected to the communication line 2abecause of the highest priority, the message may be stored in the buffer of temporary storing unit 42 and held in the buffer without being transmitted to the communication line 2b because the priority of this message may be lower than priorities of other messages on the communication line 2b. Even when there is another message to be received simultaneously with the message described above by an apparatus requiring the message described above, the apparatus cannot simultaneously receive said another message and the message described above because the message described above is held by the relay apparatus.

When the control is performed to prevent the transmission timings of other messages from overlapping with the transmission timing of the held message and to transmit other messages uniformly, the transmission is performed smoothly regardless of the degree of priority, and the communication efficiency is improved. Assume the case that a message is held by the relay apparatus 4. Even when the next message reaches, without immediately, to the relay apparatus 4 a predetermined period later in the assumed case, the other held messages may be completely relayed with several trials, and it is expected to prevent the message hold from becoming more increased and more serious.

Because of the reasons described above, the on-vehicle communication system according to the embodiment 4 utilizes the relay apparatus 4 that relays transmitted messages, controls to make ECUs 1, 1, . . . perform the adjustment in association with each other, prevents transmission timings of ECUs 1, 1, . . . from overlapping with each other, and implements the uniform transmission having no bias, for improving the communication efficiency on the communication lines 2a, 2b.

The message ID, group of classified message, contents of the relay table 47 and timing adjustment processing performed by the ECUs 1, 1, . . . in the embodiment 4 are similar to those in the embodiment 1, and thus are not explained in detail (see FIG. 3 to FIG. 7).

The on-vehicle communication system according to the embodiment 4 makes the relay apparatus 4 relay messages between the communication lines 2a, 2b. Thus, even when a message defeats the other messages on the communication line 2a in the arbitration and then is transmitted, the message may be defeated by the other messages on the other communication line 2b in the arbitration and may be held, without being transmitted, in the temporary storing unit 42 included by the relay apparatus 4. The held message may be relayed with several trials, if the relay apparatus 4 does not receive further messages sequentially transmitted from the communication line 2a. However, when the bias occurs in the transmission timings and the further messages are sequentially transmitted, the message hold at the relay apparatus 4 may become larger and more serious.

Thus, the on-vehicle communication system according to the embodiment 4 makes the relay apparatus 4 determine whether a message to be relayed is held or not, instruct each ECUs 1, 1, . . . to perform the timing adjustment for messages transmitted between the ECUs 1, 1, . . . when a message to be relayed is held, for making the ECUs 1, 1, . . . perform the timing adjustment described above. Therefore, the timing adjustment is performed for messages transmitted between the ECUs 1, 1, . . . when the relay apparatus 4 gives the instructions.

It will be described below in reference to a flowchart about the held message determination processing and instruction processing for the transmission timing adjustment performed by the relay apparatus 4, and the processing performed by each of the ECUs 1, 1, . . . when the instruction processing is performed for the timing adjustment.

Figure 17:
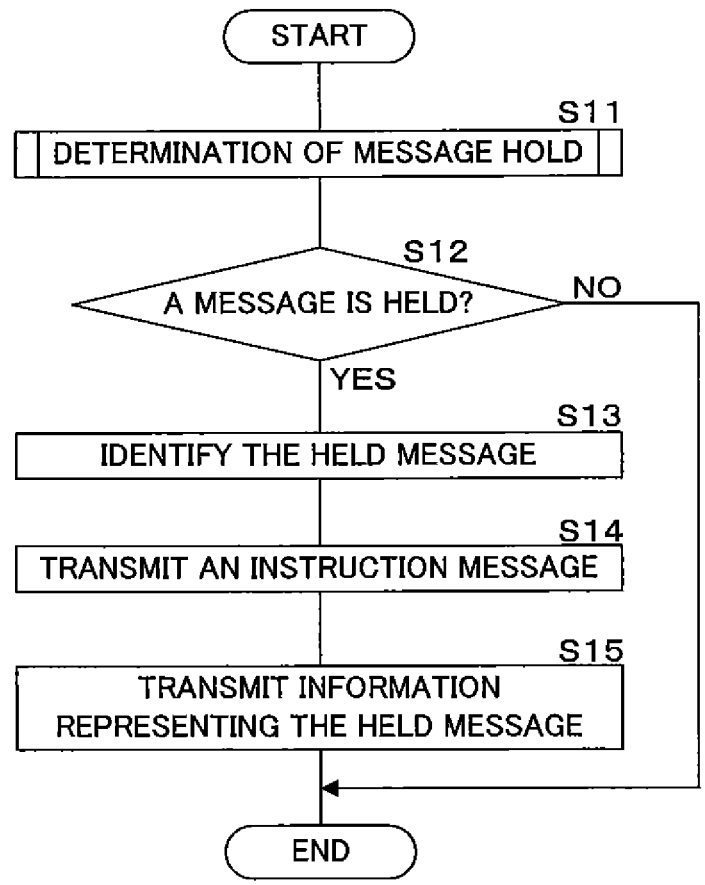
FIG. 17 is a flowchart showing an example of a procedure performed when the controlling unit included in the relay apparatus according to the embodiment 4 instructs to perform the transmission timing adjustment.

FIG. 17 is the flowchart showing an example of a procedure performed when the controlling unit 40 included in the relay apparatus 4 according to the embodiment 4 instructs to perform the transmission timing adjustment. The controlling unit 40 repeats the procedure described below with a predetermined cycle.

The controlling unit 40 makes the determining unit 46 determine whether the buffer of temporary storing unit 42 holds a stored message that is received to be relayed (step S11), and determines whether the determining unit 46 determines that the buffer holds such a stored message (step S12). The determination processing at the step S11 will be described later.

When having determined at the step S12 that the buffer is not determined to be holding such a stored message (S12: NO), the controlling unit 46 ends the procedure.

When having determined at the step S12 that the buffer is determined to be holding such a stored message (S12: YES), the controlling unit 46 identifies the held message (step S13). Specifically, the controlling unit 46 identifies a message ID representing a message stored at the head of buffer included in the temporary storing unit 42. The controlling unit 46 generates an instruction message to perform the timing adjustment for messages between the ECUs 1, 1, . . . , and transmits the generated instruction message from the first communicating unit 44 (or second communicating unit 45) at the side of corresponding communication line 2a (or communication line 2b) (step S14). In addition, the controlling unit 46 not only transmits the instruction message at the step S13 but also transmits information representing the message identified at the step S13, i.e., transmits the message ID (step S15), and completes the procedure.

The controlling unit 46 repeats the procedure described above. Therefore, the instruction message is continuously transmitted during the situation that the relay apparatus 4 is determined to be holding a message, i.e., until it is determined that no message is held.

FIG. 18 is a flowchart showing an example of a procedure regarding the determination processing performed by the determining unit 46 included in the relay apparatus 4 according to the embodiment 4, whether a message is held or not. The procedure described below explains in detail about the step S11 in the flowchart of FIG. 17.

When the controlling unit 40 has received a message, stored the received message in the buffer of temporary storing unit 42 and determined in reference to the relay table 47 stored in the storing unit 41 that the stored message should be relayed, the clocking unit 43 starts clocking the time elapsed since the message receive time point. The determining unit 46 can refer to the elapsed time that is clocked by the controlling unit 40. Thus, the determining unit 46 determines whether a predetermined time passes or not since the message stored in the buffer of temporary storing unit 42 is received to be relayed (step S101). In other words, the determining unit 46 determines whether the delay time during the message is transmitted from the transmission source ECU 1 connected to the communication line 2a and transmitted to the communication line 2b by the relay apparatus 4 is equal to or more than the predetermined time or not. For example, the "predetermined time" may be calculated in reference to the permitted delay time set for each message. In this example case, the determining unit 46 may utilize message IDs representing messages stored at the head portion of buffer to identify the permitted delay time, and may determine whether the elapsed time is over the half of permitted delay time.

When having determined at the step S101 that the elapsed time is equal to or more the predetermined time (S101: YES), i.e., when having determined that the delay time is longer, the determining unit 46 determines that a message is held by the relay apparatus 4 (step S102), and returns the procedure to the step S12 in the flowchart of FIG. 17.

When having determined at the step S101 that the elapsed time is less than the predetermined time (S101: NO), i.e., when having determined that the delay time is shorter, the determining unit 46 determines that a message is not held (step S103), and returns the procedure to the step S12 in the flowchart of FIG. 17.

It should be noted that the determination performed by the determining unit 46 whether a message is held or not is not limited to the procedure shown in the flowchart of FIG. 18. FIG. 19 is a flowchart showing another example of the procedure regarding the determination processing performed by the determining unit 46 included in the relay apparatus 4 according to the embodiment 4, whether a message is held or not.

The determining unit 46 determines whether the number of received messages stored to be relayed in the buffer of temporarily storing unit 42 is not less than a predetermined value, i.e., whether the number of messages stored without being transmitted yet is not less than the predetermined value (step S111).

When having determined that the number of not-yet-transmitted messages is equal to or more than the predetermined value (S111: YES), the determining unit 46 determines that a message is held by the relay apparatus 4 (step S112) and returns the procedure to the step S12 in the flowchart of FIG. 17.

When having determined that the number of not-yet-transmitted messages is less than the predetermined value (S111: NO), the determining unit 46 determines that no message is held by the relay apparatus 4 (step S113) and returns the procedure to the step S12 in the flowchart of FIG. 17.

The determining unit 46 utilizes the procedure shown by the flowchart of FIG. 18, procedure shown by the flowchart of FIG. 19 or both of these procedures, to determine whether a message is held or not.

When a message to be relayed is held by the relay apparatus 4, the relay apparatus 4 as described above transmits the instruction message instructing to perform the timing adjustment for messages transmitted between the ECUs 1, 1, . . . , toward the communication line 2a (or communication line 2b) connected to the transmission source ECUs 1, 1, . . . , The instruction message is transmitted to the communication line 2a (or communication line 2b) and then each of the ECUs 1, 1, . . . connected to the communication line 2a (or communication line 2b) receives the transmitted instruction message through the communicating unit 13. Thus, the ECU having received the transmitted instruction message basically starts performing the transmission timing adjustment described above, and continues performing the transmission timing adjustment described above until the transmission of instruction message is stopped (see FIG. 7A and FIG. 7B).

Thus, the on-vehicle communication system according to the embodiment 4 can make each of ECUs 1, 1, . . . connected to the communication lines 2a, 2b perform the transmission timing adjustment in association with each other, and can reduce the communication collision on the communication lines 2a, 2b. When a message is held by the relay apparatus 4, the performed transmission timing adjustment leads the relay apparatus 4 to receive messages with little bias. Therefore, it is possible to prevent the messages held by the relay apparatus 4 from becoming larger and more serious. As monitoring messages transmitted from ECUs 1, 1, . . . that are connected to the communication lines 2a, 2b for the relay processing, the relay apparatus 4 transmits the instruction messages to make the ECUs 1, 1, . . . perform the transmission timing adjustment only in the condition that a message is held. Thus, it is enough for each of ECUs 1, 1, . . . to perform the timing adjustment only when receiving the instruction message, but it is not required for each of ECUs 1, 1, . . . to perform the timing adjustment constantly. Therefore, it is possible to reduce the processing load and to implement the efficient processing.

(Embodiment 5)

The embodiment 4 is configured to make the ECUs 1, 1, . . . perform in association with each other the transmission timing adjustment based on the master message when having received the instruction message in order to prevent the transmission bias. However, an embodiment 5 leads the performed transmission timing adjustment to prevent the overlap between the transmission timing of message regarding the message hold and the transmission timing of another message, as much as possible, when it is determined that a message is held by the relay apparatus 4.

The hardware configuration of the on-vehicle communication system according to the embodiment 5 is similar to the hardware configuration according to the embodiment 4, thus the same numerals are provided to the same configuration according to the embodiment 5 which is not explained in detail. In addition, the embodiment 5 utilizes the determining unit 46 included by the relay apparatus 4 to perform the held message determination processing, which is similar to the processing of embodiment 4 and thus not explained in detail. The following description explains in detail about the procedure of instruction message transmission processing performed by the controlling unit 40 include 1 in the relay apparatus 4 and the transmission timing adjustment processing performed by the ECUs 1, 1, ..., which are different from the embodiment 4.

Figure 20:
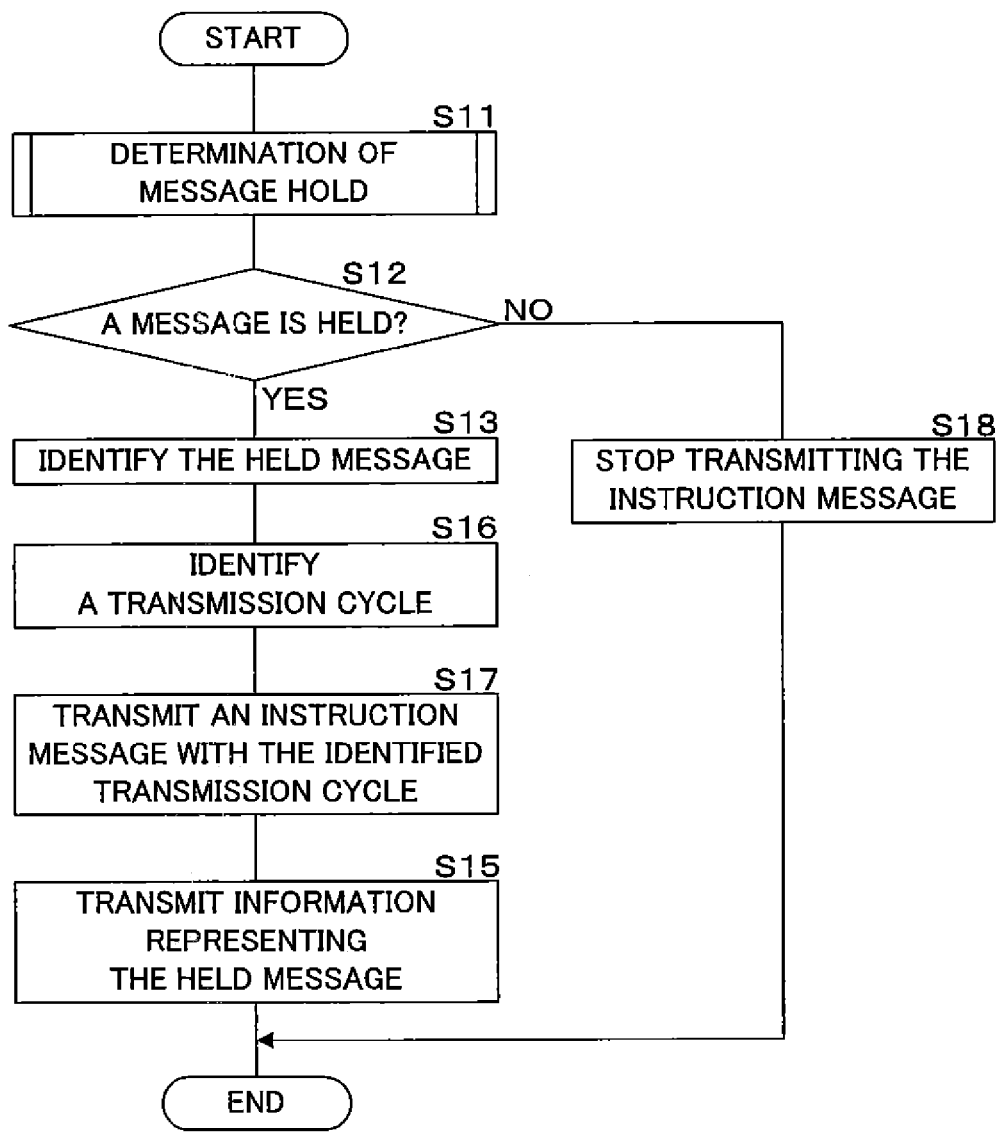
FIG. 20 is a flowchart showing an example of the procedure performed when the controlling unit included in the relay apparatus according to an embodiment 5 instructs to perform the transmission timing adjustment.

FIG. 20 is a flowchart showing an example of the procedure performed when the controlling unit 40 included in the relay apparatus 4 according to the embodiment 5 instructs to perform the transmission timing adjustment. The controlling unit 40 repeats the procedure described below with a predetermined cycle. In the procedure shown by the flowchart of FIG. 20, the processing similar to those of FIG. 17 according to the embodiment 4 are provided with the same step numbers as those of FIG. 17 and are not explained in detail.

The controlling unit 40 makes the determining unit 46 determine whether a message is held or not (S11), and determines whether the determining unit 46 determines that a message is held (S12). When having determined that the determining unit 46 determines that a message is held (S12: YES), the controlling unit 40 identifies the held message (message ID representing the held message) (S13). Next, the controlling unit 40 identifies the transmission cycle regarding the held message in accordance with the identified message ID (step S16). Then, the controlling unit 40 transmits an instruction message with the identified transmission cycle (step S17), transmits the message ID representing the held message (step S15) and completes the procedure.

When having determined that the determining unit 46 does not determine that a message is held (S12: NO), the controlling unit cyclically transmitting the instruction message stops transmitting the instruction message (step S18), and ends the procedure.

As the controlling unit 40 transmits the instruction message with the transmission cycle regarding the held message at the step S17, it is possible to inform the transmission timing of the held message to other ECUs 1, 1, ..., too.

As described in the embodiment 4, the ECUs 1, 1, ... basically performs the transmission timing adjustment based on the transmission timing of master message in response to receiving the instruction message. However, the ECUs 1, 1, ... in the embodiment 5 can further utilize the instruction message to recognize the transmission timing of held message. Therefore, it is possible to perform the transmission timing adjustment based on the transmission timing of held message.

Figure 21:
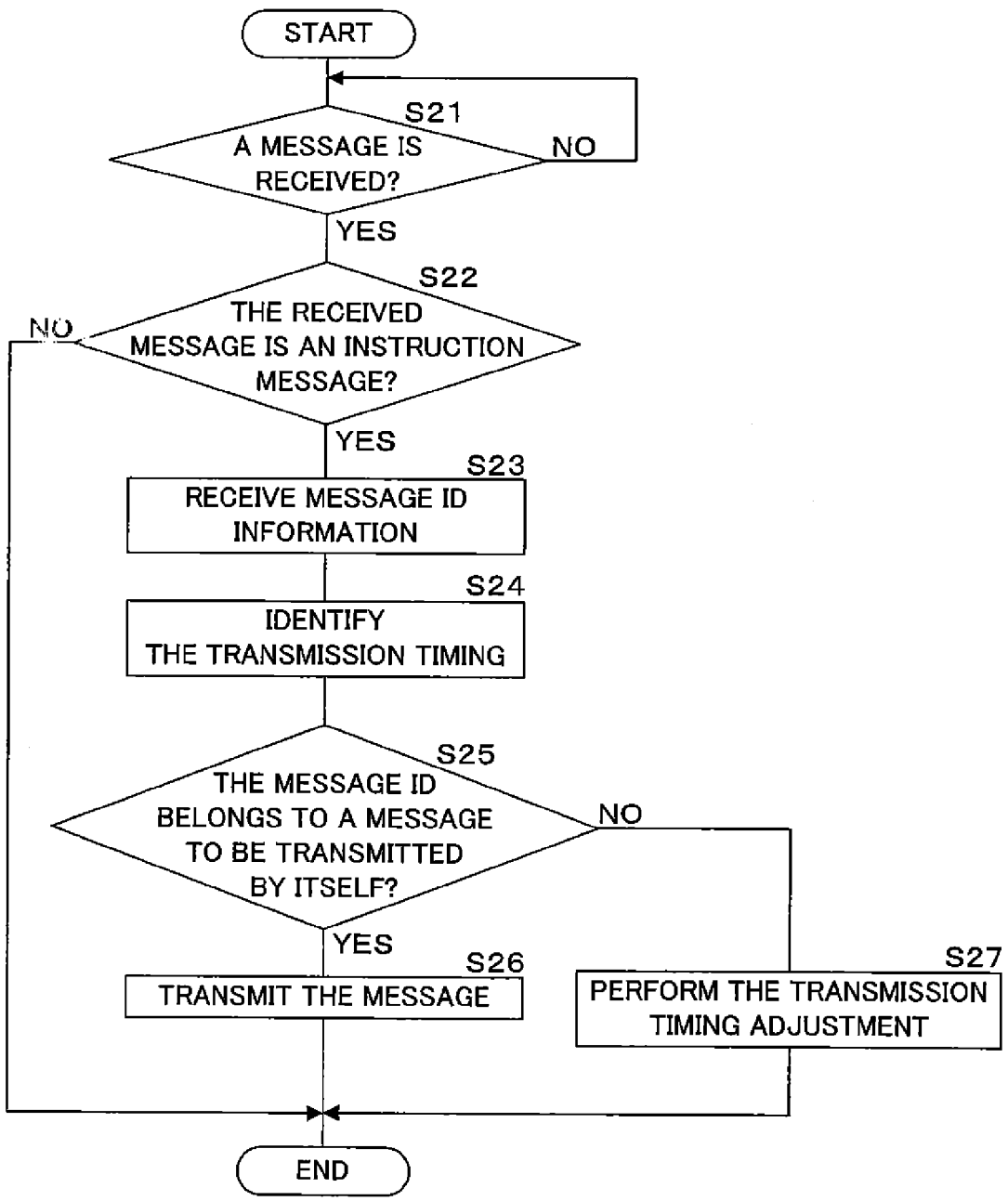
FIG. 21 is a flowchart showing an example of a procedure performed by the ECU according to the embodiment 5 for adjusting the transmission timing based on an instruction message.

FIG. 21 is a flowchart showing an example of a procedure performed by each of the ECUs 1, 1, ... according to the embodiment 5 for adjusting the transmission timing based on an instruction message. Each of the ECUs 1, 1, ... repeats the procedure described below.

The controlling unit 10 included by the ECU 1 determines whether the communicating unit 13 included by the ECU 1 receives a message or not (step S21). When having determined that the communication unit 13 does not receive a message (S21: NO), the controlling unit 10 returns the procedure to the step S21.

The controlling unit 10 determines whether the received message is an instruction message transmitted from the relay apparatus 4 or not (step S22). When having determined that the received message is not the instruction message (S22: NO), the controlling unit 10 ends the procedure once and repeats the procedure from the step S21.

When having determined that the received message is the instruction message (S22: YES), the controlling unit 10 receives message ID information transmitted together with the received instruction message (step S23). In addition, the controlling unit 10 identifies the transmission timing of instruction message, because the instruction message is cyclically transmitted with the transmission cycle of held message during the period when it is determined that a message is held (step S24).

Next, the controlling unit 10 determines whether the message ID belongs to a message to be transmitted by the controlling unit 10 itself (step S25). When having determined that the message ID belongs to a message to be transmitted by the controlling unit 10 itself (S25: YES), the controlling unit 10 makes the communicating unit 13 transmit the message to be transmitted with a transmission timing closer to the transmission timing identified at the step S24 (step S26), and completes the procedure.

The information transmitted together with the instruction message represents the message ID identifying the message held by the relay apparatus 4. Thus, when the controlling unit 10 has determined that the message ID belongs to a message to be transmitted by the controlling unit 10 itself, the controlling unit 10 can recognize that the message to be transmitted by the controlling unit 10 itself is held by the relay apparatus 4. As the relay apparatus 4 transmits the instruction message utilized as the standard regarding the held message transmission timing in order to inform the ECUs 1, 1, ... of the held message transmission timing, an ECU 1 obligated to transmit the held message transmits the held message with the transmission timing adjusted to the transmission timing of the instruction message.

When having determined at the step S25 that the message ID does not belong to a message to be transmitted by the controlling unit 10 itself (S25: NO), the controlling unit 10 makes the communicating unit 13 transmit the message to be transmitted with a transmission timing far from the transmission timing of the instruction message identified at the step S24 (step S27), and ends the procedure.

The controlling unit 10 adjusts the transmission timing at the step S27 because of the reasons described below, specifically. Each of the ECUs 1, 1, ... transmits a message with the transmission cycle. After the instruction message is transmitted, the processing at the steps S25 and S26 described above start leading the held message to be cyclically transmitted from the corresponding ECU 1 at the time point when the instruction message is transmitted or at another time point close to the time point set forth. Thus, other ECUs 1, 1, ... transmit own messages with own transmission timings properly different from the transmission timing of the held message. In other words, at the step S27, each of the other ECUs 1, 1, ... shifts own time point starting the message transmission cycle based on the transmission timing utilizing the start time point for transmitting the instruction message. For example, the controlling unit 10 included in each of the ECUs 1, 1, ... utilizes the time point starting the next transmission cycle which is the time point when the instruction message is transmitted plus the period corresponding to the half of own transmission cycle.

As described in the embodiment 4, the controlling unit 10 basically adjusts for each group the message transmission time point to become closer to the time point for transmitting the master message, and adjusts the time point for transmitting the master message to become far from the ether time points for transmitting the other master messages, too. However, when the message to be transmitted is classified into the group that includes the held message as the master message, the controlling unit 10 exceptionally adjusts the transmission time point to become far from the time point for transmitting the master message, but not to become closer to the time point for transmitting the master message. Therefore, it is possible to precisely disperse the transmission timings, and to prevent the message hold caused by the relay apparatus 4 from becoming more increased and more serious. For example, even when a message is transmitted from the communication line 2a and the message is not smoothly relayed by the relay apparatus 4 because the message has a priority which is relatively lower on the communication line 2b, the message must be transmitted with several trials. When other messages are not transmitted during said several trials from other ECUs 1, 1, . . . connected to the communication line 2a and another message is transmitted after the relay processing is almost completed on the message having the relatively lower priority, it is possible to efficiently perform the relay processing.

Figure 22:
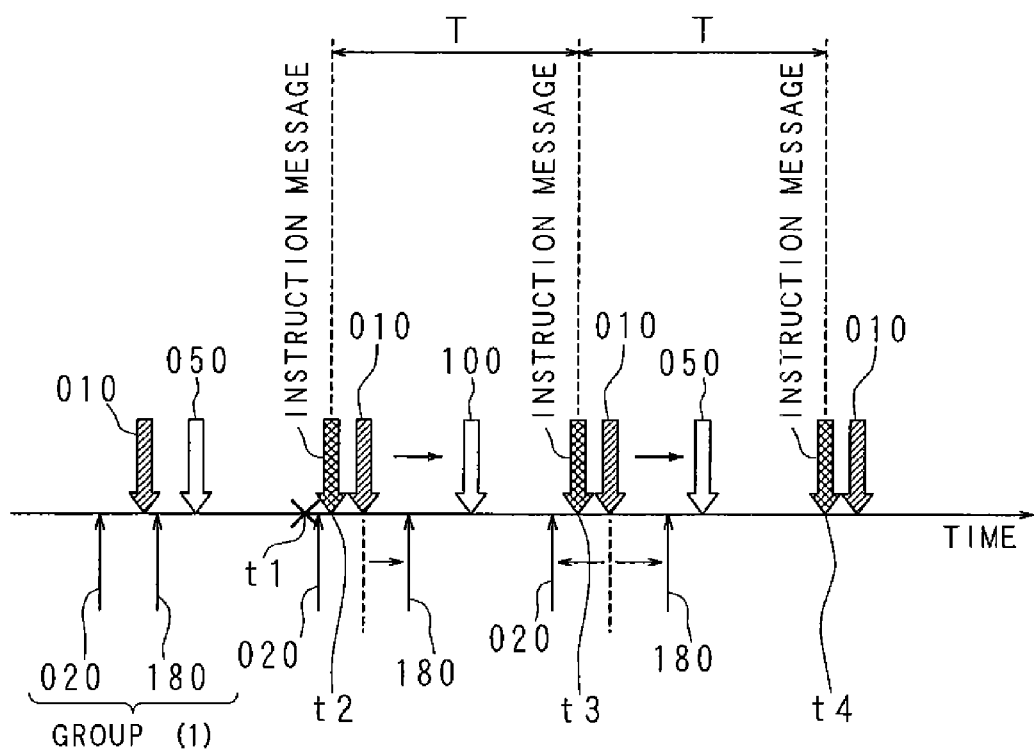
FIG. 22 is an explanation view schematically showing an example of results obtained from the transmission timing adjustment performed by the ECU according to the embodiment 5.
Figure 23A:
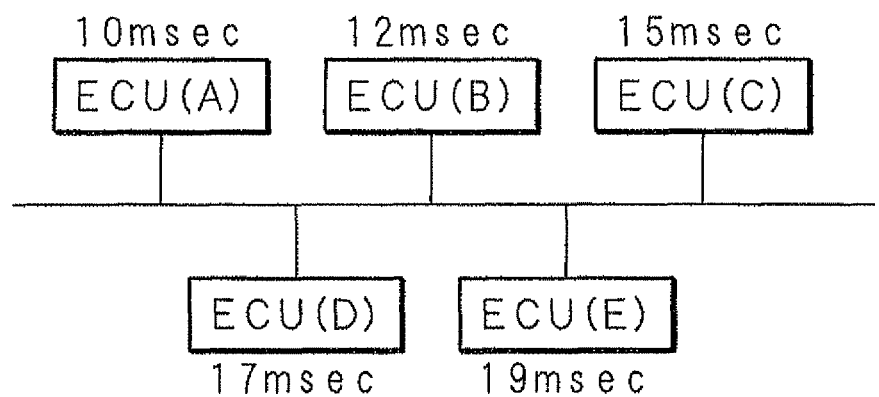
FIG. 23A is an explanation view showing an example case that a collision occurs on communication of data transmitted from an ECU through a communication line.

FIG. 22 is an explanation view schematically showing an example of results obtained from the transmission timing adjustment performed by the ECUs 1, 1, . . . according to the embodiment 5. In FIG. 22, the horizontal axis represents a temporal axis, and each arrow represents a transmission time point of each message. The transmission time point of a master message is illustrated above the temporal axis, and the transmission time point of the other message is illustrated under the temporal axis.

In the example shown in FIG. 22, the message having the message ID "010" is transmitted several times (hatched arrows). At the left side of FIG. 22, messages classified into a group (1) including the message having the message ID "010" as the master message are transmitted. Specifically, the message having the message ID "020" and the message having the message ID "180" are transmitted. In addition, the time point for transmitting the message having the message ID "050" is close to the time point for transmitting the message having the message ID "010".

Assume that the message having the message ID "010" is determined to have been held at the time point "t1" in FIG. 22 by the relay apparatus 4. In the assumed case, the relay apparatus 4 transmits the instruction message together with information representing the message ID "010" identifying the held message.

The ECU 1 obligated to transmit the message having the message ID "010" performs the second transmission of message having the message ID "010" at the time point closer to the time point "t2" when the instruction message is received. Until it is determined that the instruction message is not held, the message having the message ID "010" is transmitted at the time point "t3" and the time point "t4", in accordance with the message transmission cycle "T". The ECU 1 obligated to transmit the message having the message ID "010" performs the subsequent transmission of message having the message ID "010" at the time point closer to the time point "t3" and at the time point closer to the time point "t4". This ECU 1 may utilize the receive time point, as the start point, to recognize what the instruction message is transmitted with the transmission cycle regarding the message having the message ID "010" (i.e., to identify transmission timing), and may perform the subsequent transmission with the identified transmission timing.

When having received the instruction message, the ECUs 1, 1, . . . obligated to transmit messages having the message ID different from "010" performs the transmission at the time point far from the time point when the instruction message is received (or time point when the instruction message is transmitted). Specifically, the ECU1 obligated to transmit the message having the message ID "180" adjusts the transmission timing based on the time lag between the time point when the master message having the message ID "010" has been transmitted and own transmission time point. However, the adjusted transmission timing should be far from the transmission timing regarding the instruction message. When the time points receiving the instruction messages are detected several times, the start point and transmission cycle regarding the instruction message transmission timing are identified, and the adjustment processing for becoming far from the identified timing is contrary to the transmission timing adjustment based on the time point for transmitting the master message, the former adjustment processing is preferentially performed.

Each of ECUs 1, 1, . . . may determine whether the message ID that represents the held message transmitted together with the instruction message matches to the message ID that represents the master message classified into the group including own messages. When having determined that the message ID representing the held message matches to the message ID representing the master message, the ECU 1 may not perform the transmission timing adjustment corresponding to the magnitude of force based on the time lag that is calculated from the time point for transmitting the master message until the transmission of instruction messages is stopped.

Thus, the transmission timing adjustment is performed to make the time lag regarding the message having the message ID "180" become larger, although the message having the message ID "010" is the master message in the example shown in FIG. 22. For the rest, the timing is adjusted to be farther. Furthermore, the transmission timing adjustment is performed to make the time lag regarding the message having the message ID "020" become larger after the first instruction message is received, although the message having the message ID "010" is the master message.

Furthermore, the example shown in FIG. 22 illustrates the transmission timing adjustment performed to make the time points for transmitting the message having the message ID "100" and message having the message ID "050" become far from the time point for transmitting the message having the message ID "010".

As described above, each of the ECUs 1, 1, . . . performs the transmission timing adjustment in association with each other. Therefore, it is possible to reduce the communication collision on the communication line 2a and to improve the communication efficiency. In addition, the transmission cycle regarding the message held by the relay apparatus 4 is informed with the transmitted instruction message to the ECUs 1, 1, . . . that ought to transmit other messages. Hence, each of the ECUs 1, 1, . . . can perform the transmission timing adjustment with preventing another message from being transmitted until the held message is completely relayed. Therefore, it is possible to prevent the held message to be relayed by the relay apparatus 4 from becoming more increased and more serious, and to improve the communication efficiency for the whole on-vehicle communication system including the relay apparatus 4.

The embodiments 1 to 5 are explained in the context of on-vehicle communication system. However, the present invention is not limited to the communication system mounted on a vehicle (car). The present invention can be applied to the communication system where data is exchanged between plural communication apparatuses, the plural communication apparatuses work in association with each other, and the transmission timing adjustment is required to prevent the collision between the communication apparatuses from occurring.

It should be understood that the embodiment described herein is only illustrative of the present invention and that various modifications may be made thereto without departing from the scope of the invention as defined in the appended claims.

The invention claimed is:

1. A vehicular communication apparatus, comprising:
a connecting unit that connects to a communication line connected to a vehicular ECU;
a determining unit that determines whether a transmission timing adjustment should be performed for a message on the communication line or not; and
an instruction transmitting unit that transmits a performance instruction message, from the connecting unit, which instructs to perform the transmission timing adjustment when the determining unit has determined that the transmission timing adjustment should be performed.

2. A vehicular communication apparatus according to claim 1, wherein plural vehicular ECUs are connected to the communication line with a bus topology.

3. A vehicular communication apparatus according to claim 1, further comprising:
a message number counting unit that counts a number of messages transmitted to the communication line during a monitoring period, wherein
the determining unit determines in accordance with the number counted by the message number counting unit.

4. The vehicular communication apparatus according to claim 3, wherein
the message number counting unit cyclically counts with utilizing the monitoring period as one cycle, and
when the determining unit has consecutively determined during a predetermined period that the transmission timing adjustment should not be performed, the instruction transmitting unit transmits from the connecting unit a stop instruction message that instructs to stop performing the transmission timing adjustment.

5. A vehicular communication apparatus according to claim 3, wherein
the monitoring period consists of plural time intervals, and
the message number counting unit counts a number of messages transmitted to the communication line during each time interval.

6. A vehicular communication apparatus according to claim 5, further comprising:
an obtaining unit that obtains a message distribution based on the number of messages counted for each time interval by the message number counting unit; and
a setting unit that sets a time point for starting to transmit the performance instruction message in accordance with the message distribution obtained by the obtaining unit, wherein
when the determining unit has determined that the transmission timing adjustment should be performed, the instruction transmitting unit transmits the performance instruction message at the time point set by the setting unit.

7. A vehicular communication apparatus, comprising:
a connecting unit that connects to a communication line connected to a vehicular ECU;
a determining unit that determines whether a transmission timing adjustment should be performed for a message on the communication line or not;
an instruction transmitting unit that transmits a performance instruction message, from the connecting unit, which instructs to perform the transmission timing adjustment when the determining unit has determined that the transmission timing adjustment should be performed,
a message number counting unit that counts a number of messages transmitted to the communication line during a monitoring period, wherein
the determining unit determines in accordance with the number counted by the message number counting unit,
wherein
the monitoring period consists of plural time intervals, and
the message number counting unit counts a number of messages transmitted to the communication line during each time interval, and
wherein
when not less than a predetermined number of time intervals are indicated to have "zero" as the number counted by the message number counting unit, the determining unit determines that the transmission timing adjustment should be performed, and
when less than the predetermined number of time intervals are indicated to have "zero" as the number counted by the message number counting unit, the determining unit does not determine that the transmission timing adjustment should be performed.

8. A vehicular communication system according to claim 7, further comprising:
a hold judging unit that judges whether a message transmitted to the communication line is held or not, wherein
when the hold judging unit judges that the message transmitted to the communication line is held, the determining unit determines that the transmission timing adjustment should be performed,
when the hold judging unit does not judge that the message transmitted to the communication line is held, the determining unit does not determine that the transmission timing adjustment should be performed, and
said some apparatus performs the transmission timing adjustment in association with the other apparatuses.

9. A vehicular communication system according to claim 8, further comprising:
a storing unit that stores a message received through the communication line by the relaying unit;
a message transmitting unit that cyclically transmits a message stored in the storing unit;
a timing identifying unit that identifies a timing utilized for transmitting the performance instruction message by the instruction transmitting unit;
a message identification information transmitting unit that transmits a message identification information to the communication line when the performance instruction message is transmitted, the message identification information being for identifying a message stored in the storing unit;
an apparatus identifying unit that identifies an apparatus, among the plural apparatuses, which has transmitted the message identified with the message identification information, wherein
the instruction transmitting unit transmits the performance instruction message with a timing corresponding to a transmission cycle utilized by the message transmitting unit, and
the apparatus identified by the apparatus identifying unit makes own transmission timing become closer to the timing identified by the timing identifying unit.

10. A vehicular communication system according to claim 9, wherein
apparatuses other than the apparatus identified by the apparatus identifying unit make own transmission timing become farther from the timing identified by the timing identifying unit.

11. A vehicular communication apparatus, comprising:
a connecting unit that connects to a communication line connected to a vehicular ECU;
a determining unit that determines whether a transmission timing adjustment should be performed for a message on the communication line or not;
an instruction transmitting unit that transmits a performance instruction message, from the connecting unit, which instructs to perform the transmission timing adjustment when the determining unit has determined that the transmission timing adjustment should be performed,
a message number counting unit that counts a number of messages transmitted to the communication line during a monitoring period, wherein
the determining unit determines in accordance with the number counted by the message number counting unit, wherein
the monitoring period consists of plural time intervals, and
the message number counting unit counts a number of messages transmitted to the communication line during each time interval, and
wherein
when there is a time interval whose counted number by the message number counting unit is not less than a predetermined number, the determining unit determines that the transmission timing adjustment should be performed, and
when there is no time interval whose counted number by the message number counting unit is not less than the predetermined number, the determining unit does not determine that the transmission timing adjustment should be performed.

12. A communication apparatus, comprising:
a connecting unit that connects to a communication line connected to a vehicular ECU;
a determining unit that determines whether a transmission timing adjustment should be performed for a message on the communication line or not;
an instruction transmitting unit that transmits a performance instruction message, from the connecting unit, which instructs to perform the transmission timing adjustment when the determining unit has determined that the transmission timing adjustment should be performed,
a message number counting unit that counts a number of messages transmitted to the communication line during a monitoring period, wherein
the determining unit determines in accordance with the number counted by the message number counting unit, wherein
the monitoring period consists of plural time intervals, and
the message number counting unit counts a number of messages transmitted to the communication line during each time interval, and
wherein
when the maximum is not less than predetermined-folds of the minimum in the numbers counted by the message number counting unit for the plural time intervals, the determining unit determines that the transmission timing adjustment should be performed, and
when the maximum is less than predetermined-folds of the minimum in the numbers counted by the message number counting unit for the plural time intervals, the determining unit does not determine that the transmission timing adjustment should be performed.

13. A vehicular communication apparatus, comprising:
a connecting unit that connects to a communication line connected to a vehicular ECU;
a determining unit that determines whether a transmission timing adjustment should be performed for a message on the communication line or not;
an instruction transmitting unit that transmits a performance instruction message, from the connecting unit, which instructs to perform the transmission liming adjustment when the determining unit has determined that the transmission timing adjustment should be performed,
a message number counting unit that counts a number of messages transmitted to the communication line during a monitoring period, wherein
the determining unit determines in accordance with the number counted by the message number counting unit,
a receiving unit that receives a message through the connecting unit; and
a hold judging unit that judges whether the message received by the receiving unit is held or not, wherein
when the hold judging unit judges that the message received by the receiving unit is held, the determining unit determines that the transmission timing adjustment should be performed, and
when the hold judging unit does not judge that the message received by the receiving unit is held, the determining unit does not determine that the transmission timing adjustment should be performed, the apparatus further comprising:
an elapsed time clocking unit that clocks a time elapsed since the receiving unit receives a message, wherein
when the time clocked by the elapsed time clocking unit is not less than a predetermined time, the hold judging unit judges that the message received by the receiving unit is held, and
when the time clocked by the elapsed time clocking unit is less than the predetermined time, the hold judging unit does not judge that the message received by the receiving unit is held.

14. A vehicular communication apparatus according to claim 13, further comprising:
a storing unit that stores a message received by the receiving unit; and
an enumerating unit that enumerates a number of messages stored in the storing unit, wherein
when the number enumerated by the enumerating unit is not less than a predetermined number, the hold judging unit judges that the message received by the receiving unit is held, and
when the number enumerated by the enumerating unit is less than a predetermined number, the hold judging unit does not judge that the message received by the receiving unit is held.

15. A vehicular communication apparatus according to claim 13, further comprising:
a message transmitting unit that cyclically transmits a message stored in the storing unit; and
an identifying unit that identifies a transmission cycle utilized by the message transmitting unit, wherein
the instruction transmitting unit utilizes a timing corresponding to the transmission cycle identified by the identifying unit to transmit the performance instruction message.

16. A vehicular communication apparatus according to claim 15, wherein the instruction transmitting unit continuously transmits the performance instruction message until the hold judging unit judges that the message received by the receiving unit is not held.

17. A vehicular communication system having a relay apparatus connected to a communication line that is connected to plural apparatuses, comprising:
- a message number counting unit that counts a number of messages transmitted to the communication line during a monitoring period;
- a determining unit that determines in accordance with the number counted by the message number counting unit whether a transmission timing adjustment should be performed for a message on the communication line or not;
- an instruction transmitting unit that transmits a performance instruction message to the communication line which instructs to perform the transmission timing adjustment, when the determining unit determines that the transmission timing adjustment should be performed;
- a detecting unit that detects a time point when a predetermined message is transmitted, after some apparatus among the plural apparatuses receives the performance instruction message;
- a message transmitting unit that cyclically transmits a message from said some apparatus; and
- a time lag sensing unit that senses a time lag between the time point detected by the detecting unit and a time point when the message transmitting unit transmits the message, wherein the message transmitting unit sets a next time point for transmitting a next message in accordance with the time lag sensed by the time lag sensing unit.

18. A communication method with a vehicular communication apparatus connected to a communication line that is connected to plural apparatuses, comprising steps of:
- counting a number of messages transmitted to the communication line during a monitoring period;
- determining in accordance with the counted number of messages whether a transmission timing adjustment should be performed for a message on the communication line or not; and
- transmitting a performance instruction message from the vehicular communication apparatus when it is determined that the transmission timing adjustment should be performed, the performance instruction message being for instructing to perform the transmission timing adjustment.

19. A communication method according to claim 18, further comprising steps of:
- judging whether a message transmitted to the communication line is held or not;
- determining that the transmission timing adjustment should be performed, when it is judged that the message transmitted to the communication line is held;
- failing to determine that the transmission timing adjustment should be performed, when it is not judged that the message transmitted to the communication line is held; and
- controlling an apparatus having received the performance instruction message to perform the transmission timing adjustment in association with the other apparatuses.

* * * * *